(12) United States Patent
Karabetsos

(10) Patent No.: US 7,774,223 B2
(45) Date of Patent: Aug. 10, 2010

(54) SYSTEM AND METHOD FOR SCHEDULING LOCATION-SPECIFIC SERVICES

(76) Inventor: Nick Karabetsos, 22701 W. Schwerman Rd., Mundelein, IL (US) 60060

( * ) Notice: Subject to any disclaimer, the term of this patent is extended or adjusted under 35 U.S.C. 154(b) by 1188 days.

(21) Appl. No.: 11/068,320

(22) Filed: Feb. 28, 2005

(65) Prior Publication Data
US 2006/0195365 A1 Aug. 31, 2006

(51) Int. Cl.
G06F 9/46 (2006.01)
(52) U.S. Cl. ............................... 705/9; 705/6
(58) Field of Classification Search ............... 705/9, 705/8, 26, 6; 379/221.02
See application file for complete search history.

(56) References Cited

U.S. PATENT DOCUMENTS

| 5,440,479 | A | | 8/1995 | Hutton |
| 5,732,398 | A | | 3/1998 | Tagawa |
| 5,920,846 | A | * | 7/1999 | Storch et al. ................... 705/7 |
| 5,948,040 | A | | 9/1999 | DeLorme et al. |
| 5,960,411 | A | | 9/1999 | Hartman et al. |
| 6,032,130 | A | | 2/2000 | Alloul et al. |
| 6,101,483 | A | | 8/2000 | Petrovich et al. |
| 6,202,933 | B1 | | 3/2001 | Poore et al. |
| 6,286,029 | B1 | | 9/2001 | Delph |
| 6,641,037 | B2 | | 11/2003 | Williams |
| 6,744,938 | B1 | | 6/2004 | Rantze et al. |
| 6,764,003 | B1 | | 7/2004 | Martschitsch et al. |
| 6,985,872 | B2 | * | 1/2006 | Benbassat et al. ............... 705/8 |
| 7,096,193 | B1 | * | 8/2006 | Beaudoin et al. ............... 705/26 |
| 7,127,412 | B2 | * | 10/2006 | Powell et al. ................... 705/9 |
| 7,363,247 | B1 | * | 4/2008 | Barnhill et al. ................. 705/26 |
| 2002/0040935 | A1 | | 4/2002 | Weyant |
| 2003/0057280 | A1 | | 3/2003 | Mandile |
| 2003/0205616 | A1 | | 11/2003 | Graves et al. |
| 2005/0240459 | A1 | * | 10/2005 | Cox ............................. 705/8 |

FOREIGN PATENT DOCUMENTS

| CA | 2 303 827 A1 | 9/2001 |
| DE | 299 24 565 U1 | 11/2003 |
| GB | 2 281 714 A | 3/1995 |

OTHER PUBLICATIONS

European Search Report, Application No. EP 05 10 3392, Dec. 9, 2005, 3 pages.

* cited by examiner

Primary Examiner—Simon Sing
(74) Attorney, Agent, or Firm—Meroni & Meroni, P.C.; Charles F. Meroni, Jr.; Christopher J. Scott

(57) ABSTRACT

A system for scheduling a location-specific service appointment, the system comprising a communication network, a target service location, a desired service type, a service provider grouping, and an availability calendar. The communication network interconnects data input devices, data output devices, and a central processing unit (CPU). The CPU unit comprises a precompiled service provider database. The target service location and the desired service type are input into the CPU and the service provider database, comprising a plurality of service provider resumes, is searched. The select service provider grouping is compiled based on matched service location information and service expertise information. At least one service provider resume is selected from the select service provider grouping and the availability calendar is then provided upon a data output device. The selected service provider resume, a selected calendar day, and a selected appointment time operate to schedule a location-specific service provider appointment.

9 Claims, 33 Drawing Sheets

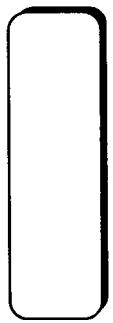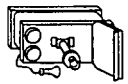
FIG. 3

*No Handyman Franchise Found For Your Zip Code*

Handyman Pros does not currently service your area. We would like to discuss options with you. Please touch the phone below to call us directly, or call us at:

35

34

Touch here to enter the zip code again.

Dialing Phone. Please do not pick up the handset until instructed to do so...

Now, tell us what product you would like to have installed. Use the on-screen keyboard below to enter the item number on your reciept, or simply use the scanner to scan your iten into the system.

item number

| A | B | C | D | E | F | G | H | I | J | 7 | 8 | 9 |
| K | L | M | N | O | P | Q | R | S | T | 4 | 5 | 6 |
| U | V | W | X | Y | Z | ' | . | , | @ | 1 | 2 | 3 |
| Space | | | | | | Previous Field | Next Field | | Clear | 0 | Back |

Back  Start Over  Call The Office

39 →

If you need assistance at any time during the process, simply touch this phone icon and pick up the handset on this kiosk. You will be connected to your local professional handyman.

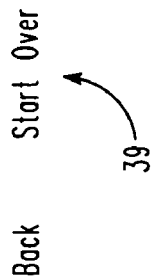

Next

*FIG. 11*

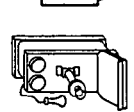
FIG. 20

Please fill in the following information to secure your appointment date. If you are already a customer of Handyman Pros enter your phone number and click "Find ME". Otherwise enter your information below

Bill To Information

Phone # _____   Find Me!
Last name _____

First name _____
Address _____
City State Zip _____ 60047
Email _____

| A | B | C | D | E | F | G | H | I | J | 7 | 8 | 9 |
| K | L | M | N | O | P | Q | R | S | T | 4 | 5 | 6 |
| U | V | W | X | Y | Z | , | . | @ | | 1 | 2 | 3 |

Space    Previous Field    Next Field    Clear    0    Back

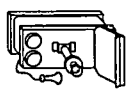

If you need assistance at any time during the process, simply touch this phone icon and pick up the handset on this kiosk. You will be connected to your local professional handyman.

Back    Start Over    Call The Office    Next

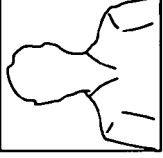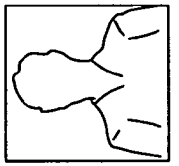
FIG. 28A

FIG. 29

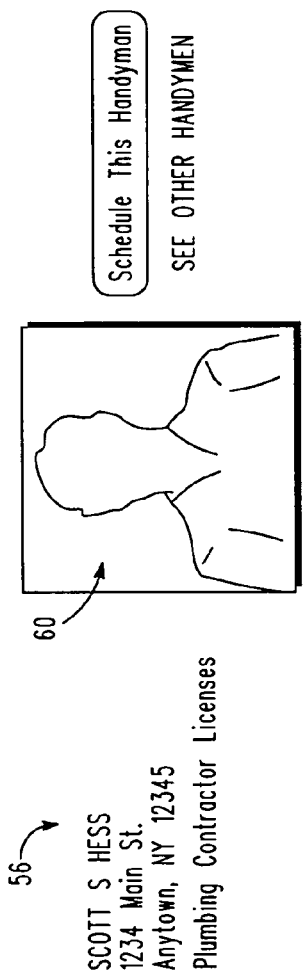

SCOTT S HESS
1234 Main St.
Anytown, NY 12345
Plumbing Contractor Licenses

[ Schedule This Handyman ]

SEE OTHER HANDYMEN

---

BUSINESS INFORMATION:

0) IN BUSINESS SINCE: 1954

0) PROFILE:
At Leonard's Plumbing & electrical Repairs we are a full service company that strives for customer satisfaction. We have been in the business for over 24 years. When it come to your needs please let us be your first choice.

1) Expertise:
Our company does service and new installations.

2) Awards:
Dwyer bench mark award

3) Affiliation:
Members of the Lake Zurich and barrington area chamber of commerces 4) Insurance information:
| Type | Amount | Exp. Date | |
|---|---|---|---|
| Liability | $2,000,000.00 | 06-24-2005 | General |
| Type | Amount | Exp. Date | |
| Compensation | $500.000 | 06-24-2005 | General |

57

```
Name:    GAYLE S
RATING 91 to 10):    10
Comments:   Great job as usual. We will call you again.
```

```
Name:    GAYLE S
RATING 91 to 10):    10
Comments: It was a pleasure to have your technician in our home.
          His knowledge of the job work is greatly appreciated.
```

```
Name:    TONI W
RATING 91 to 10):    10
Comments: SCOTT PROVIDED OUTSTANDING SERVICE.
```

*FIG. 30*

You have scheduled the following appointments with Handyman Pros Services.

Installation with SCOTT H HESS on 1/10/2005 at 8:00 AM.

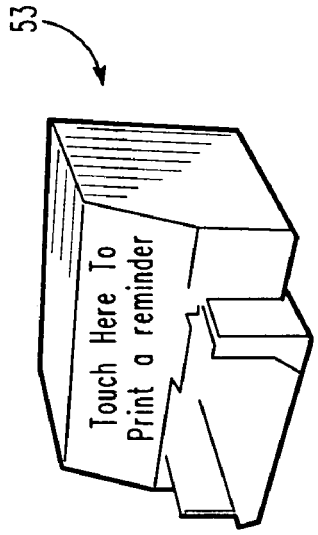

You will be formally notified by phone prior to the appointment date.

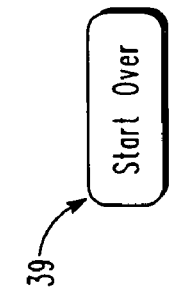

Call The Office

If you need assistance at any time during the process, simply touch this phone icon and pick up the handset on this kiosk. You will be connected to your local professional handyman.

FIG. 33

SYSTEM AND METHOD FOR SCHEDULING LOCATION-SPECIFIC SERVICES

BACKGROUND OF THE INVENTION

1. Field of the Invention

The present invention generally relates to method for scheduling services commonly performed or provided by so-called handymen. More particularly, the present invention relates to a system and method for scheduling handyman-specific services from in-store locations (kiosk applications) or via on-line locations (web-based applications), including installation services, replacement services, repair services, assembly services, construction services, maintenance services, cleaning services, and/or a combination of the foregoing services.

2. Description of the Prior Art

With the advent of computers, the inevitability of inventive computer-based methodologies became clear. Software developers continually develop electronic means for achieving inventive end results. Service industries, for example, have seen rapid growth in the use of kiosk and/or web-based interface means for enabling consumers to order services and/or products. In this regard, a number of inventive systems and methods have been developed as a means to embrace consumer demands and provide the marketplace with quicker, more efficient ways to meet consumer demand. A number of the more pertinent U.S. patent disclosures describing various systems and methodologies for providing consumers with quicker, more efficient ways to meet consumer demands are described hereinafter.

U.S. Pat. No. 5,440,479 ('479 patent), which issued to Hutton, discloses an Apparatus and Method for Purchasing Floral Arrangements. The '479 patent relates to a floral kiosk system which interacts with a floral ordering network and which allows users to either select a particular floral arrangement or create a floral arrangement from an assortment of flowers, flower configurations and flower holders. Once the purchase order is completed, the system of the '479 patent interacts with a floral network to complete the transaction.

U.S. Pat. No. 5,732,398 ('398 patent), which issued to Tagawa and U.S. Pat. No. 5,948,040 ('040 patent), which issued to DeLorme et al., disclose computerized travel-related service order systems. The '398 patent specifically teaches a system for enabling users of the disclosed device to search date availability for various travel-related services. The '040 patent also specifically teaches a system for enabling users to select dates via an iterative planning process for various travel-related services.

U.S. Pat. No. 5,960,411 ('411 patent), which issued to Hartman et al, and U.S. Pat. No. 6,032,130 ('130 patent), which issued to Alloul et al., both disclose electronic purchasing systems. The '411 patent specifically teaches a system for purchasing products via web-based applications. The '130 patent specifically teaches a system wherein users may access product information (similar to that of a traditional catalog) via either a kiosk-based device or from the user's personal computer (and thus through web-based applications). Users of the system taught by the '130 patent can order both products and services through the disclosed system.

U.S. Pat. No. 6,101,483 ('483 patent), which issued to Petrovich et al., discloses a Personal Shopping System Portable Terminal. The '483 patent teaches means for ordering various goods and/or services via a portable shopping device. The '483 patent focuses on the portability of the device for enabling shoppers to more effectively carry out their shopping goals. U.S. Pat. No. 6,286,029 ('029 patent), which issued to Delph, discloses a Kiosk Controller that Retrieves Content from Servers and then Pushes the Retrieved Content to a Kiosk in the Order Specified in a Run List. The '029 patent discloses methods and means for ordering products and/or services from either a kiosk-based in-store system or via the Internet.

U.S. Pat. No. 6,641,037 ('037 patent), which issued to Williams, discloses a Method and System for Interactively Providing Product Related Information on Demand and Providing a Personalized Transactional Benefits at a Point of Purchase. The '037 patent may function through the use of a kiosk type system to gather both product and service related information. U.S. Pat. No. 6,744,938 1 ('938 patent), which issued to Rantze et al., discloses a Retail Terminal Utilizing an Image Scanner for Product Attribute and Identification and Consumer Interactive Querying. Notably, the device of the '938 patent teaches the use of a kiosk-based system that may function to provide users thereof with service order information related to the products being queried.

U.S. Pat. No. 6,764,003 ('003 patent), which issued to Martschitsch et al., discloses a Transaction Method and Selling System. The '003 patent teaches a transaction method between a customer and one of a plurality of service terminals which supply selectable products and/or services, subject to costs, on location, as well as a sales system for carrying out the transaction method, whereby, by means of a portable mobile device of the customer, an order record comprising a service terminal identification of the service terminal is transmitted via a mobile radio network to a service center, the service center checking the credit worthiness of the customer from whom the order record was transmitted, and in the case of positive credit worthiness, transmitting a credit record comprising a credit value via a communication network to the service terminal identified through the service terminal identification and whereby, on the bases of the credit record, the service terminal releases the selection for a product and/or of a service and supplies the desired product or the desires service corresponding to the selection made by the customer, and a supply confirmation comprising a cost amount for the supplied product or the supplied service is transmitted to the service center which debits the cost amount to an account of the customer.

From a review of these prior art disclosures and from a general consideration of other pertinent prior art generally known to exist, it will be seen that the prior art does not disclose business methodology utilizing either a kiosk application or web-based application to enable consumers to schedule product installation services, product replacement services (or other services) from remote locations, whereby the consumer can select a product-related service or other handyman service, then select a geographic specific handyman they want to use for the service, then schedule the date and time for the service to take place. The prior art does not teach methodology whereby both the geographic specific handymen and a centralized management office (i.e. a handyman headquarters) retain site-specific hardware for operating proprietary software designed to appraise the geographic specific handymen and the handyman headquarters as to service appointments so that the service appointments may be timely met.

More specifically, it will be seen that the prior art does not teach a Handyman Scheduling System (HSS) that functions to enable the consumer to select a specific handyman that they want to use for scheduling the appointment, which decision can be based on several criteria. For example, the prior art does not teach methodology whereby the handyman's picture, profile and references are all available to the consumer, each handyman potentially offering a discount for a certain period of time that may factor into the decision. All of the information provided about each handyman can be edited and updated by the handyman themselves using a software utility.

Further, it will be seen that the prior art does not teach a HSS that functions to enable the consumer to electronically schedule a service appointment via a communication network without requiring the consumer to speak with the centralized management office. In this regard, the prior art does not teach or otherwise disclose a HSS that provides consumers with information regarding available service days and available service times for the selected geographically-specific handyman. The prior art does not teach or otherwise disclose a HSS that functions to automatically enter into the service appointment schedule a service appointment, which service appointment information is immediately made available to the central management office as well as to the selected geographically-specific handyman.

It will be further seen that the prior art does not teach or otherwise show a HSS that functions to enable the consumer to schedule an installation for a product that they have purchased by entering or scanning the item number into the software-driven system. Further, the prior art does not teach or otherwise show a HSS that functions to enable a consumer to schedule other services and/or purchase products (i.e. obtain product securement services) through the handyman.

Further, the prior art does not teach or otherwise disclose a HSS that functions to search and match service date availability for a specific product skill requirement with a qualified product skill level technician's available dates. Further, the prior art does not teach or otherwise disclose a HSS that functions to search and match location availability for a specific product skill requirement with a qualified product skill level technician's available installation dates in the same zip code (and/or a bordering zip code location) as the target site for service.

In this regard the prior art thus perceives a need for business methodology utilizing either an in-store kiosk application or site-specific web-based application to enable consumers to schedule handyman type services from remote locations, including installation services, replacement services, repair services, assembly services, construction services, maintenance services, cleaning services, and/or a combination of the foregoing services as summarily indicated hereinabove. More particularly in this last regard, the prior art perceives a need for a business methodology whereby a consumer can select a product-related service or other handyman service, then select a geographically-specific handyman they want to use for the service, then schedule the date and time for the service to take place. The prior art perceives a need for a business methodology whereby both geographic specific handymen and the overseeing management team may be simultaneously appraised as to handyman service appointments. The prior art perceives a need for a methodology whereby geographic specific handymen and a centralized handyman management office (i.e. a handyman headquarters) both retain site-specific hardware for operating proprietary software designed to appraise the geographic specific handymen and the handyman headquarters as to service appointments so that the service appointments may be timely met.

SUMMARY OF THE INVENTION

It is thus an object of the present invention to provide a business methodology incorporating the use of either in-store kiosk application or online, web-based application to enable consumers to schedule installation, replacements and other services from remote locations, whereby a consumer can select a product-related service or other handyman service, then select a geographic specific handyman they want to use for the service, then schedule the date and time for the service to take place. It is a further object of the present invention to provide a methodology whereby both geographic specific handymen and a centralized management office (i.e. a handyman headquarters) may retain site-specific hardware for operating proprietary software designed to appraise the geographic specific handymen and the handyman headquarters as to service appointments so that the service appointments may be timely met.

More particularly, it is an object of the present invention to provide a Handyman Scheduling System (HSS) or a service provider scheduling system that functions to enable the consumer to electronically select and schedule a handyman or other service provider based on several criteria, including the service provider's picture, profile and references are all available to the consumer, each handyman potentially offering a discount for a certain period of time that may factor into the decision. Still further, it is an object of the present invention to provide a HSS or service provider scheduling system whereby all of the information provided about each handyman or service provider can be edited and updated by the service provider using a software utility.

Further, it is an object of the present invention to provide a scheduling system that enables the user consumer to schedule a service appointment online and thus does not require the consumer to speak with a central management office. In this regard, it is an object of the present invention to provide a scheduling system that provides consumers with information regarding available days and available times for the select service provider. It is a further object of the present invention to provide a scheduling system that automatically enters a service appointment into a service provider's schedule, which service appointment information is immediately made available to the service provider.

It is a further object of the present invention to provide a scheduling system that enables the consumer to schedule product installation services for a product that they have purchased. Further, it is an object of the present invention to provide a scheduling system that enables a consumer to schedule other services and/or purchase products (obtain product securement services) through the service provider.

Further, it is an object of the present invention to provide a scheduling system that searches and matches service date availability for a specific product skill requirement with a service provider's skill level. More particularly, in this last regard, it is an object of the present invention to provide a scheduling system that searches and matches location availability for a qualified service provider in the same zip code (and/or a bordering zip code location) as the target site for service.

To achieve these and other readily apparent objectives, the present invention comprises a system or method for enabling a user to electronically schedule a location-specific service appointment, the system comprising electronic means for scheduling, a target service location, a desired service type, a select service provider grouping, and an availability calendar. The electronic means for scheduling comprises data input means, data output means, central processing means, and a communication network. The communication network electronically interconnects the data input means, the data output means and the central processing means. The central processing means comprises a precompiled service provider database. The target service location and the desired service type are input into the central processing means via the data input means and the communication network. The service provider database, comprising a plurality of service provider resumes, is searched. Each service provider resume comprises a plurality of service provider attributes, which service provider attributes comprise service location information and service expertise information. The target service location is matched with the service location information and the desired service type is matched with the service expertise information. The select service provider grouping is compiled based on the matched service location information and the matched service expertise information. The select service provider grouping is then displayed upon the data output means, and comprises at least one service provider resume. At least one service provider resume is selected from the select service provider grouping and the availability calendar is then displayed upon the data output means. The availability calendar corresponds to the selected service provider resume and comprises a plurality of calendar days, each calendar day comprising an available appointment time listing. At least one calendar day and at least one appointment time are selected from the availability calendar. The selected service provider resume, the selected calendar day, and the selected appointment time thus operate to electronically schedule a location-specific service provider appointment.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of my patent drawings, as follows:

FIG. No. 1 is a flow chart diagram showing Start Process routine methodology.

Figure 1:
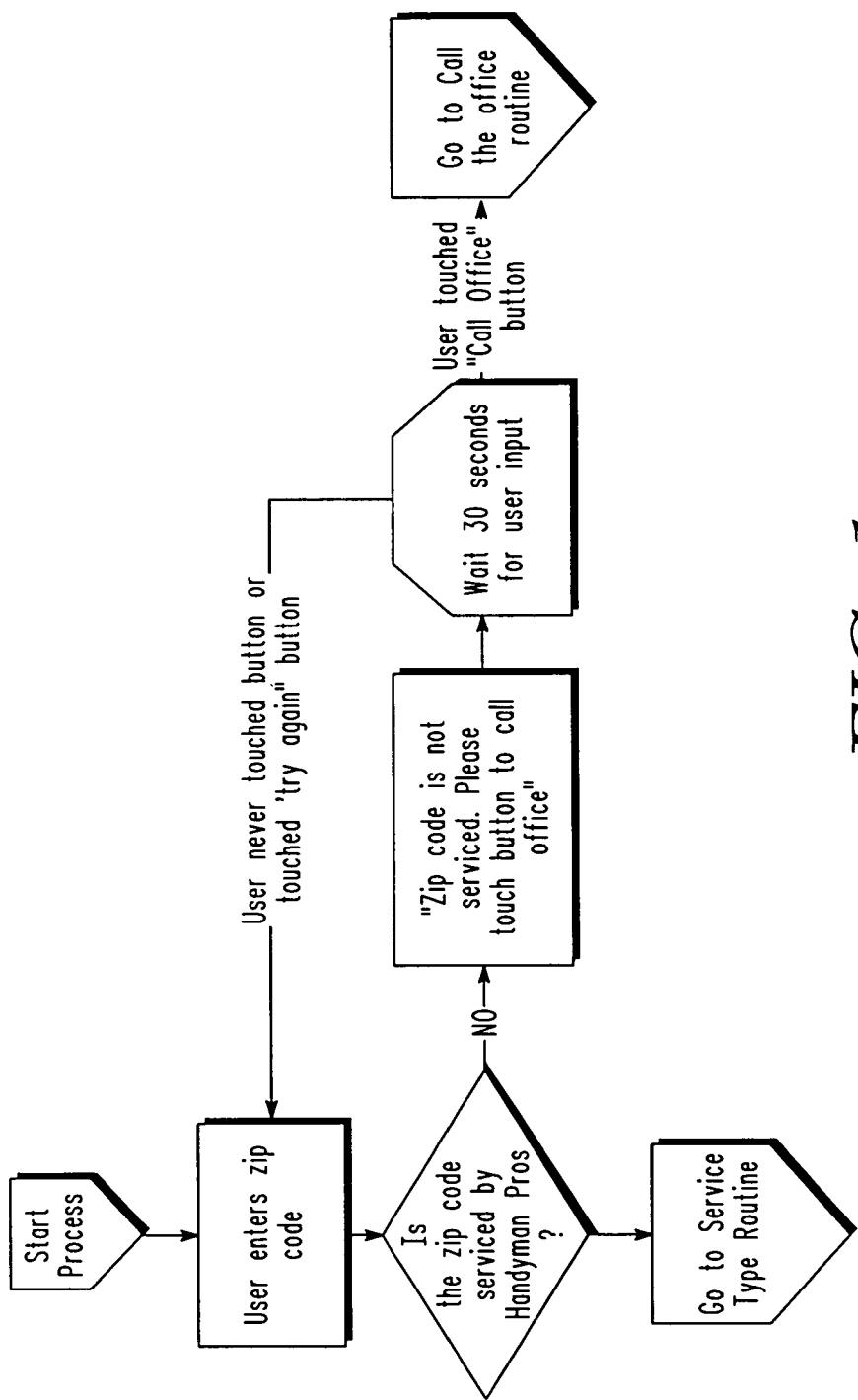
Figure 2:
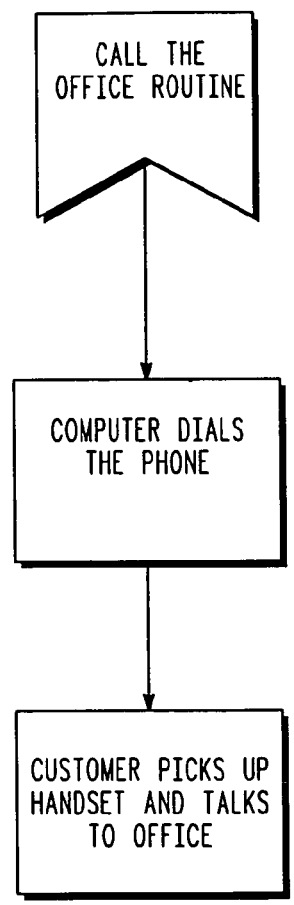
Figures 4, 5:
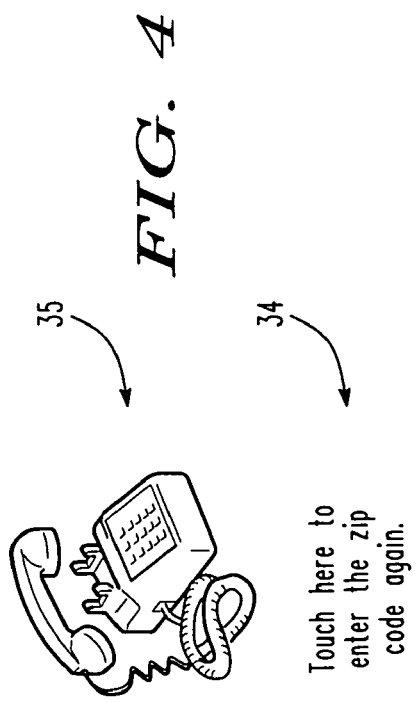
Figure 6:
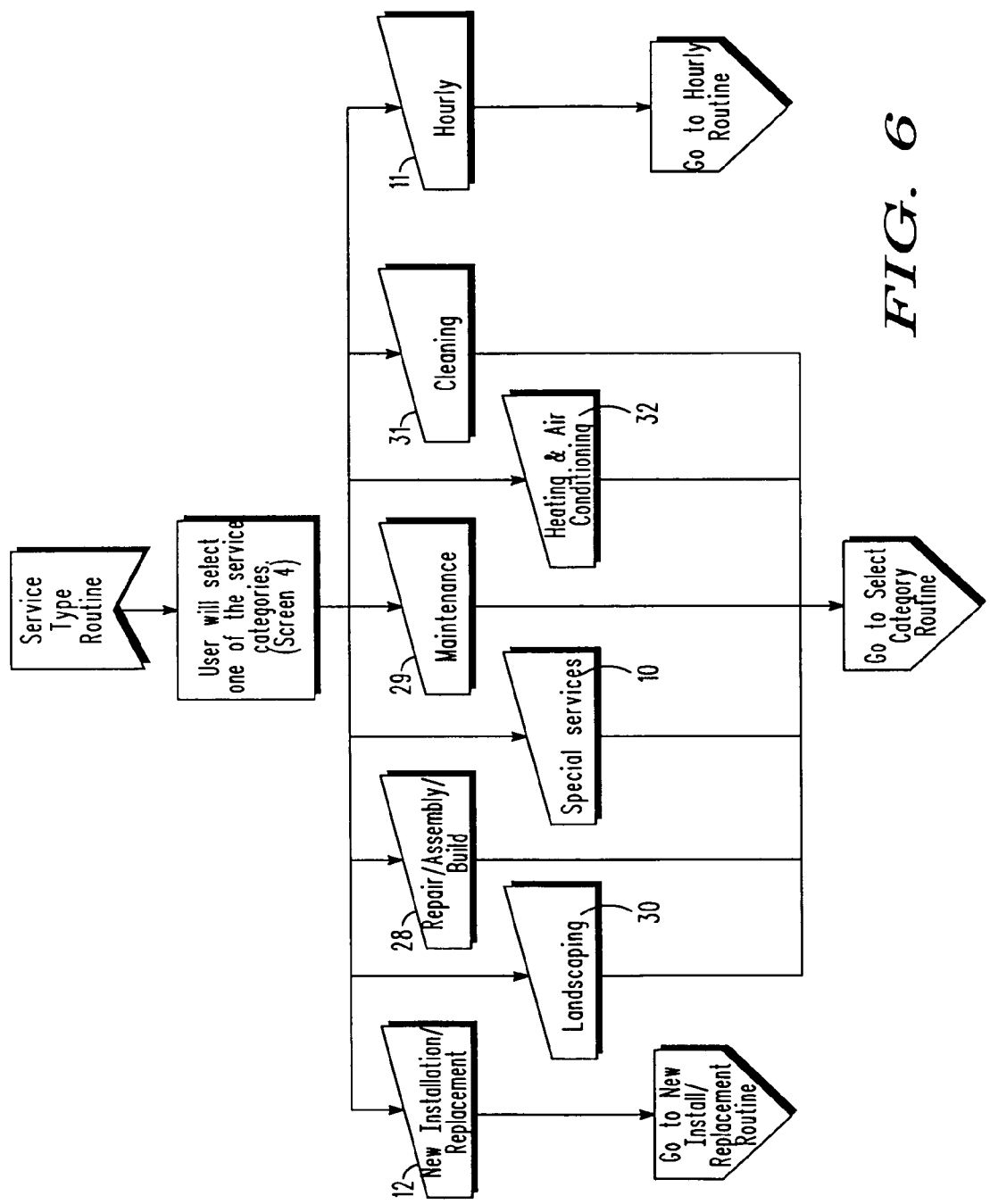
Figure 7:
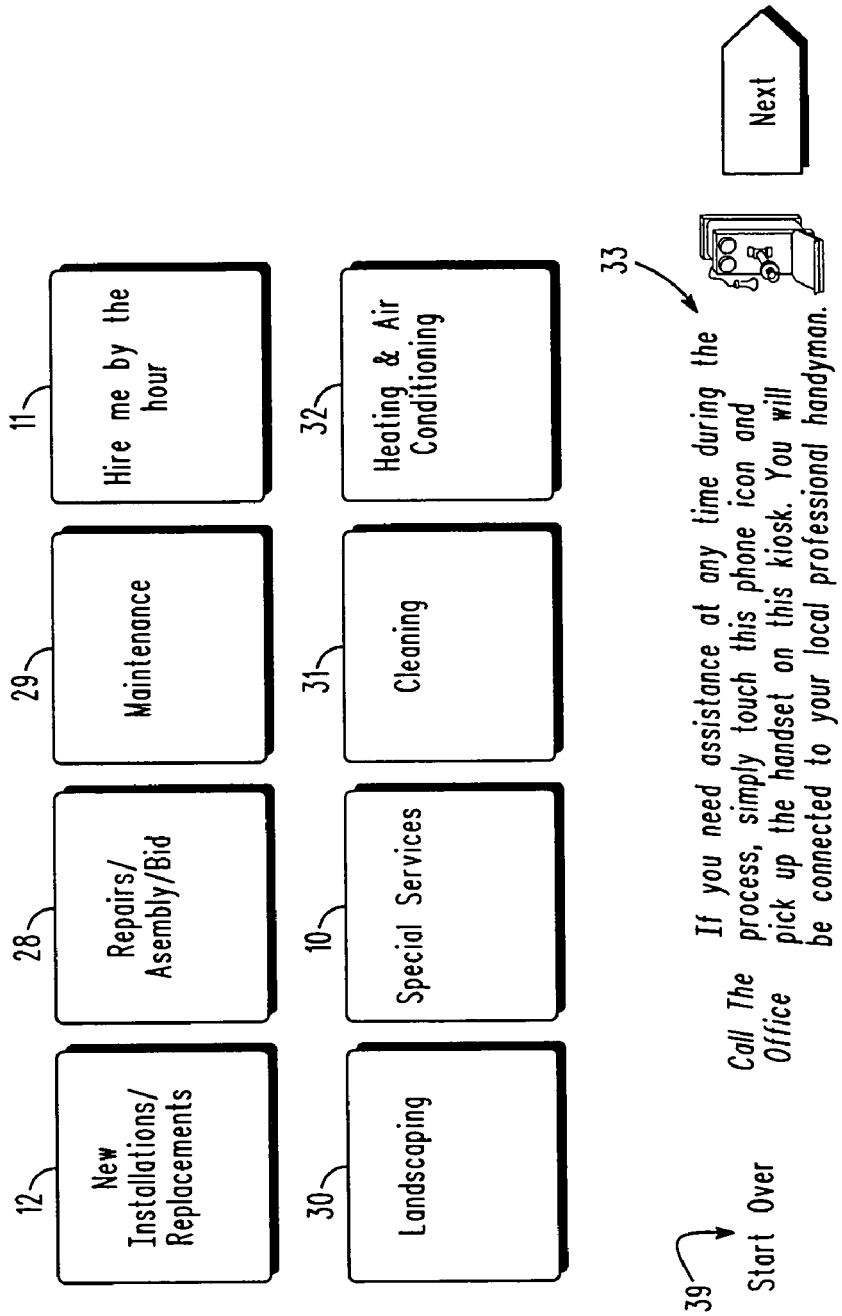
Figure 8:
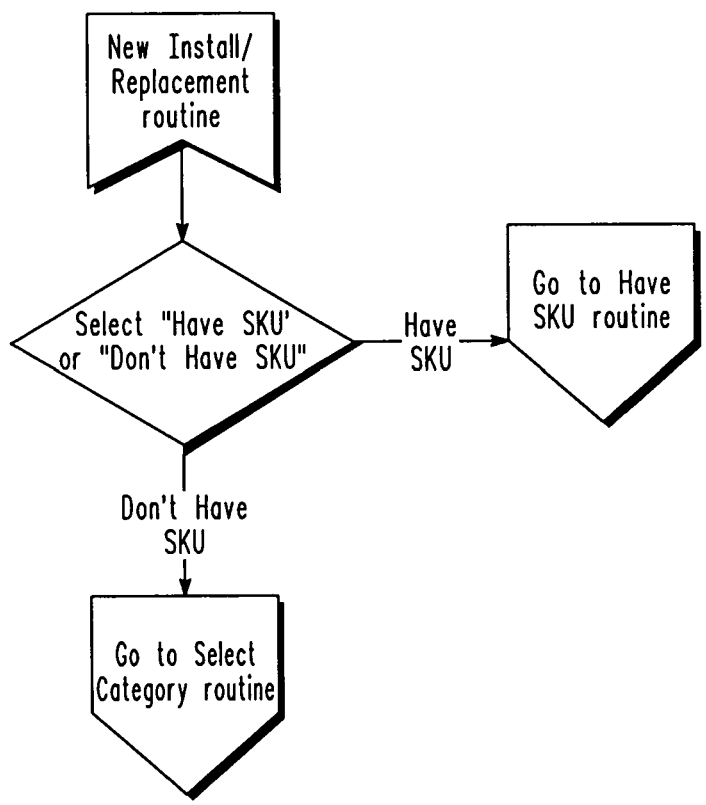
Figure 9:
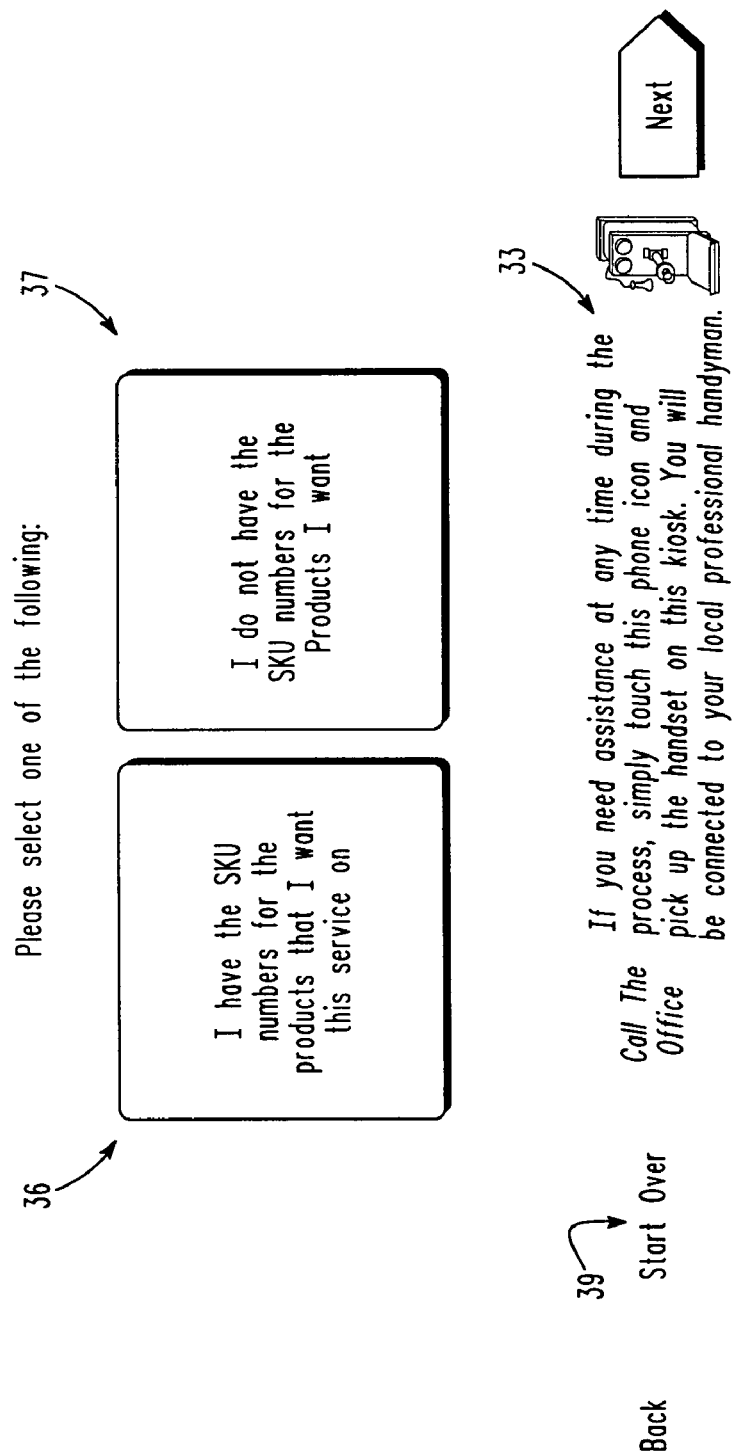
Figure 10:
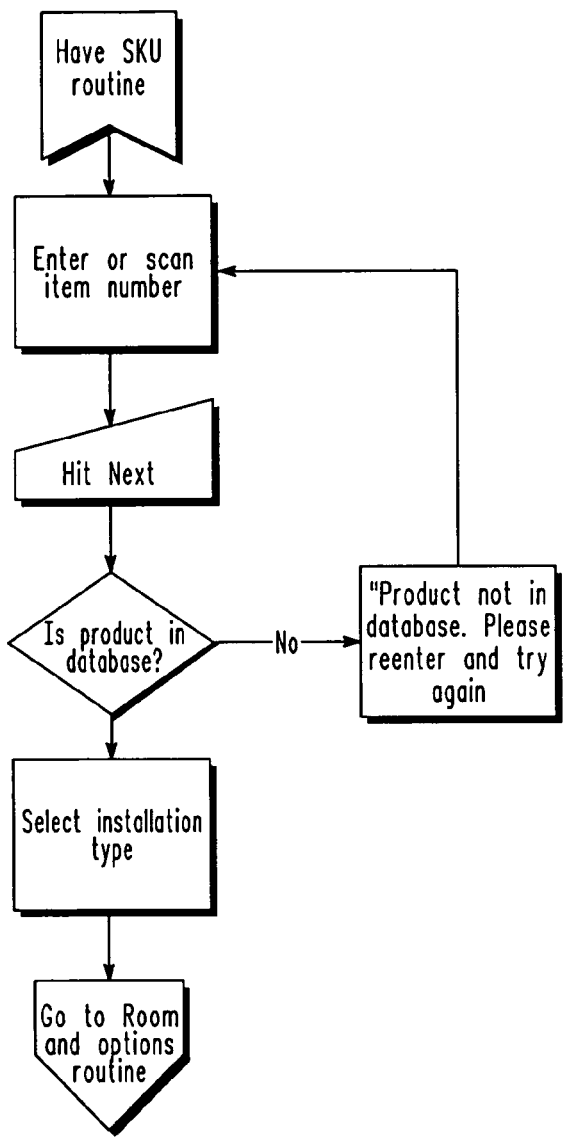
Figure 12:
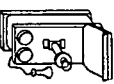
Figure 13:
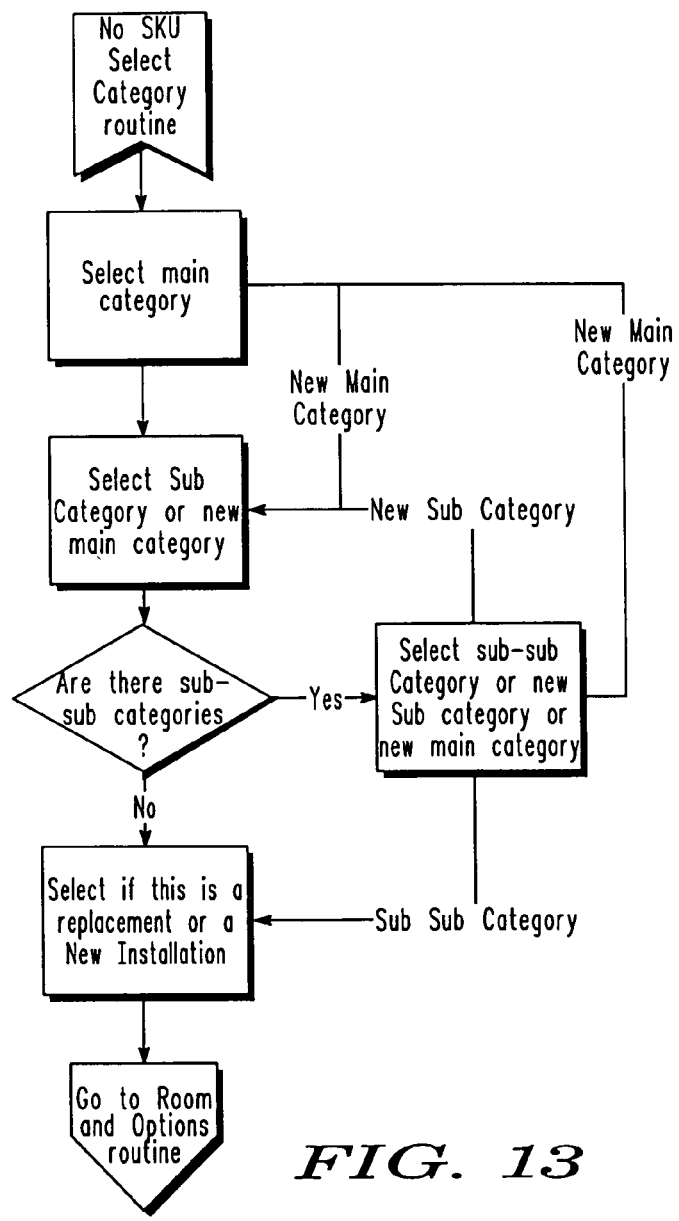
Figure 14:
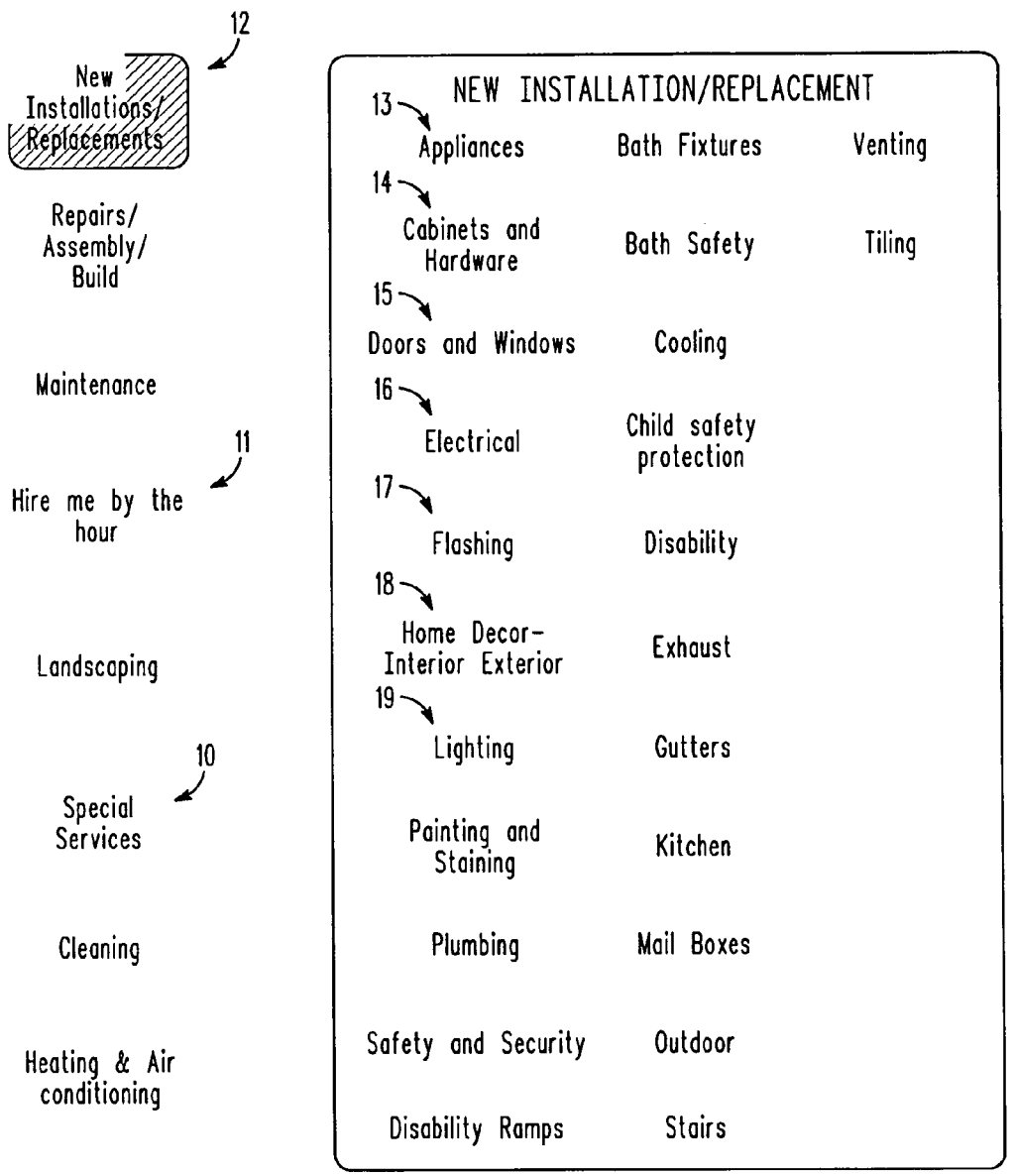
Figure 15:
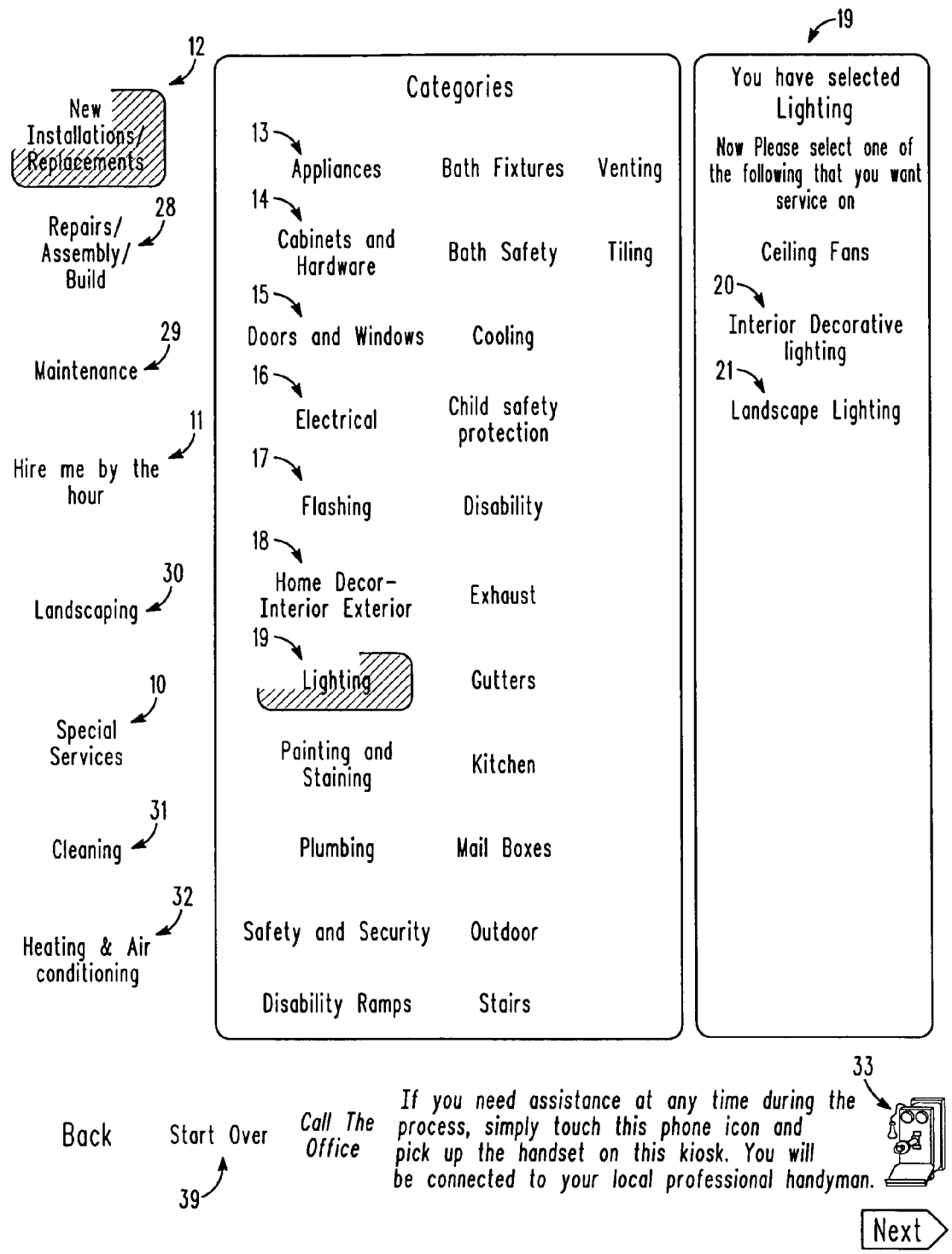
Figure 16:
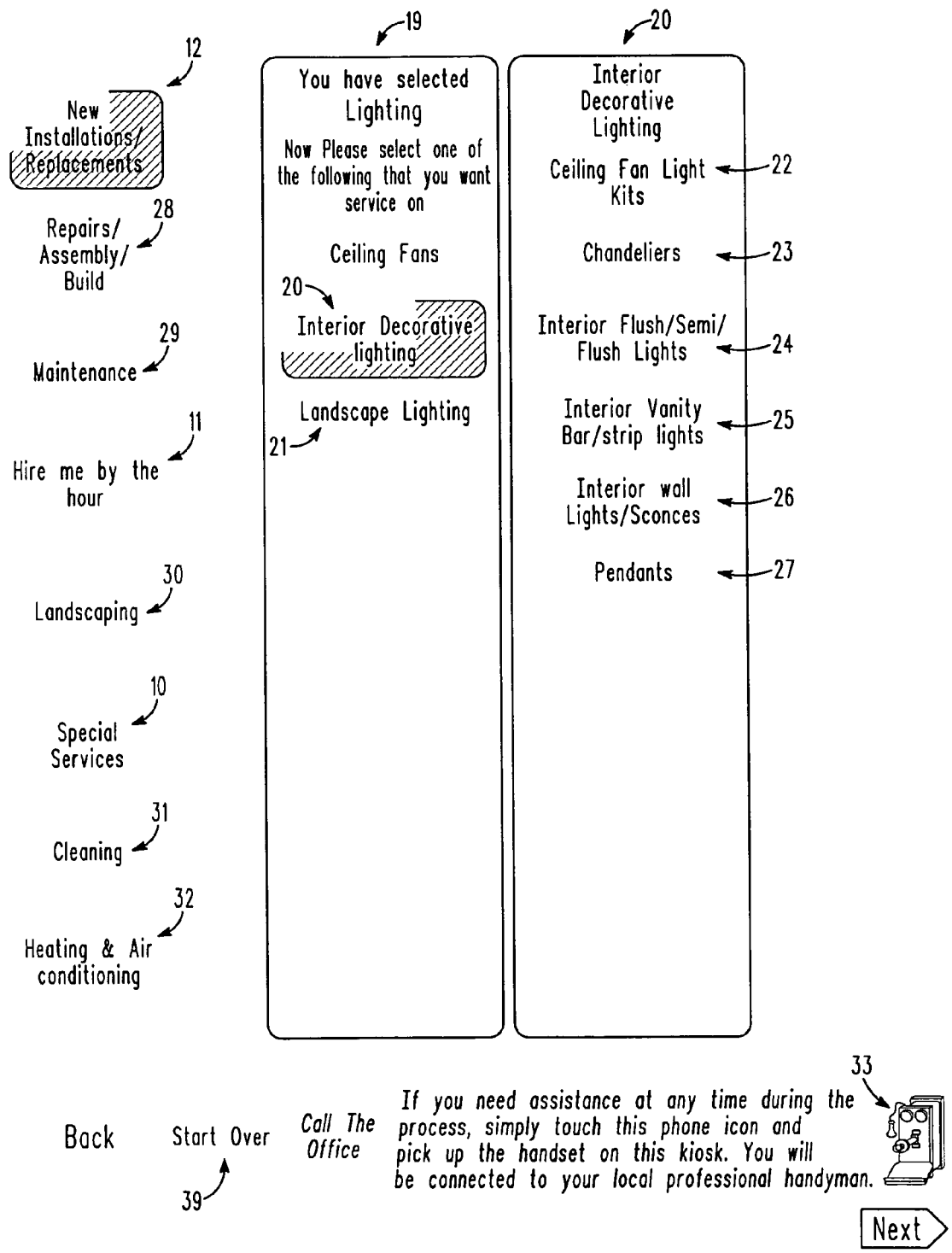
Figure 17:
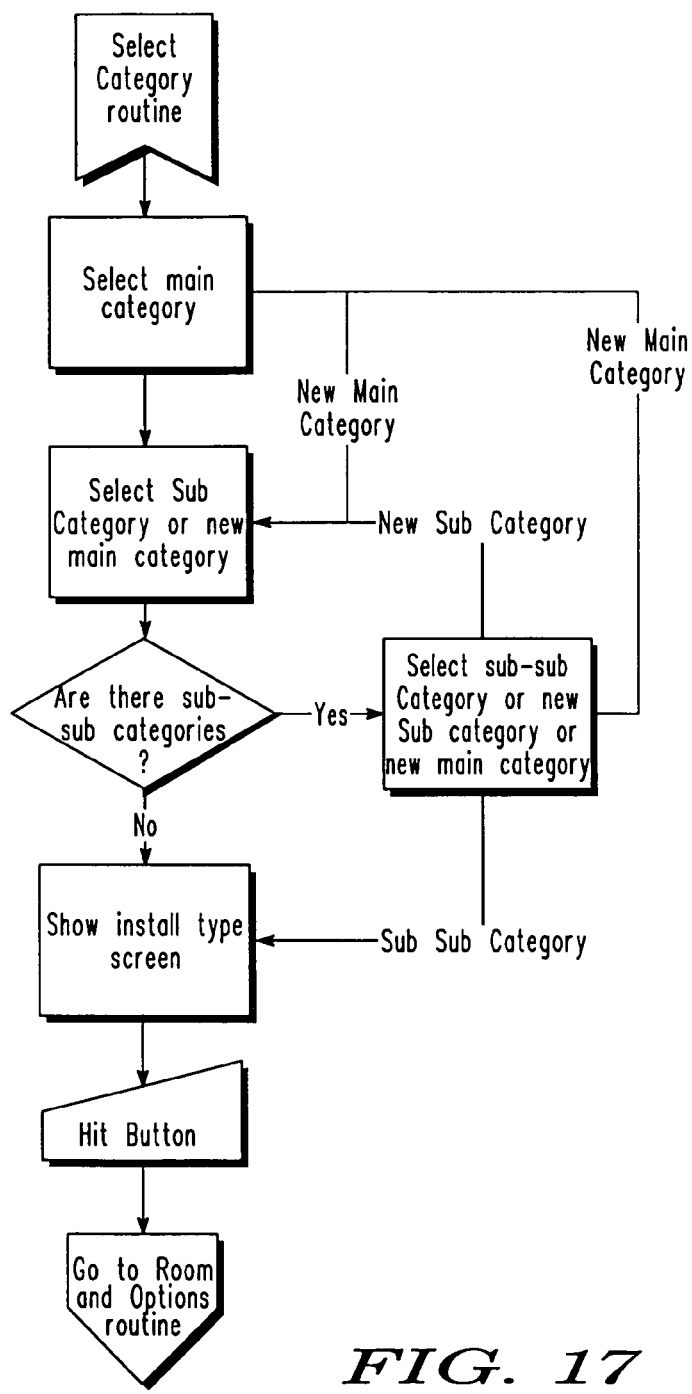
Figure 18:
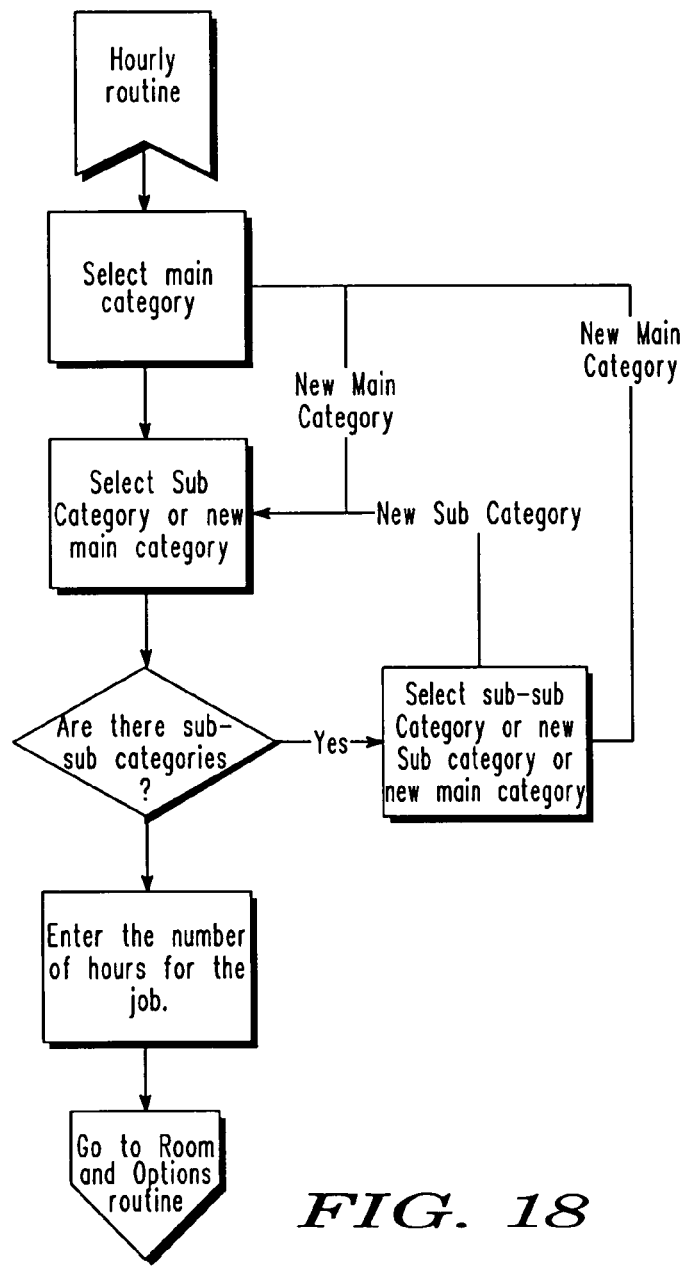
Figure 19:
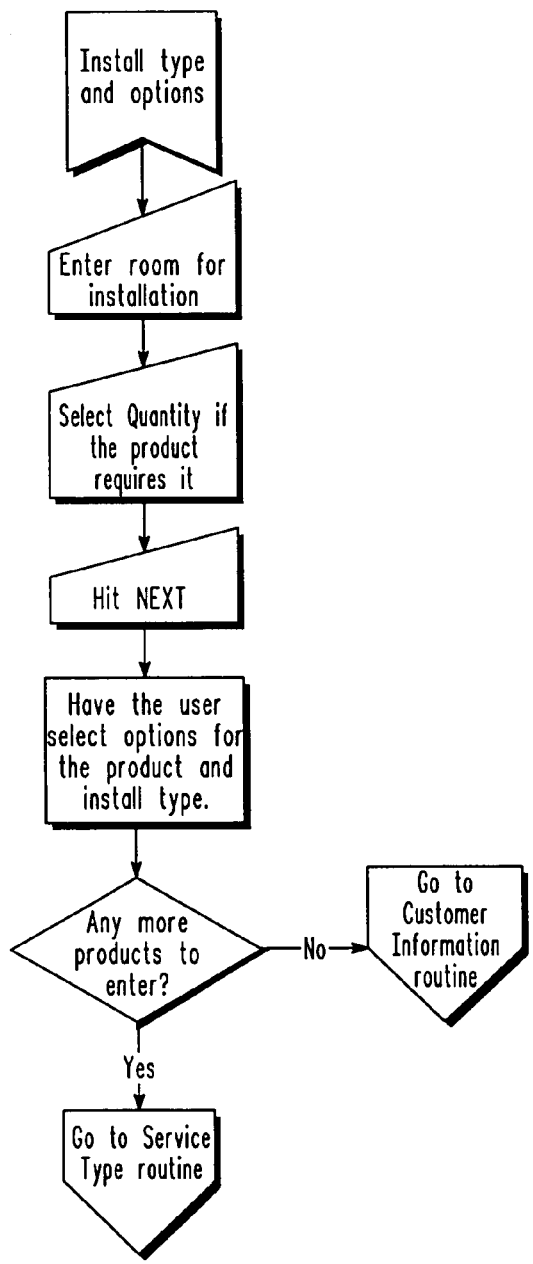
Figure 21:
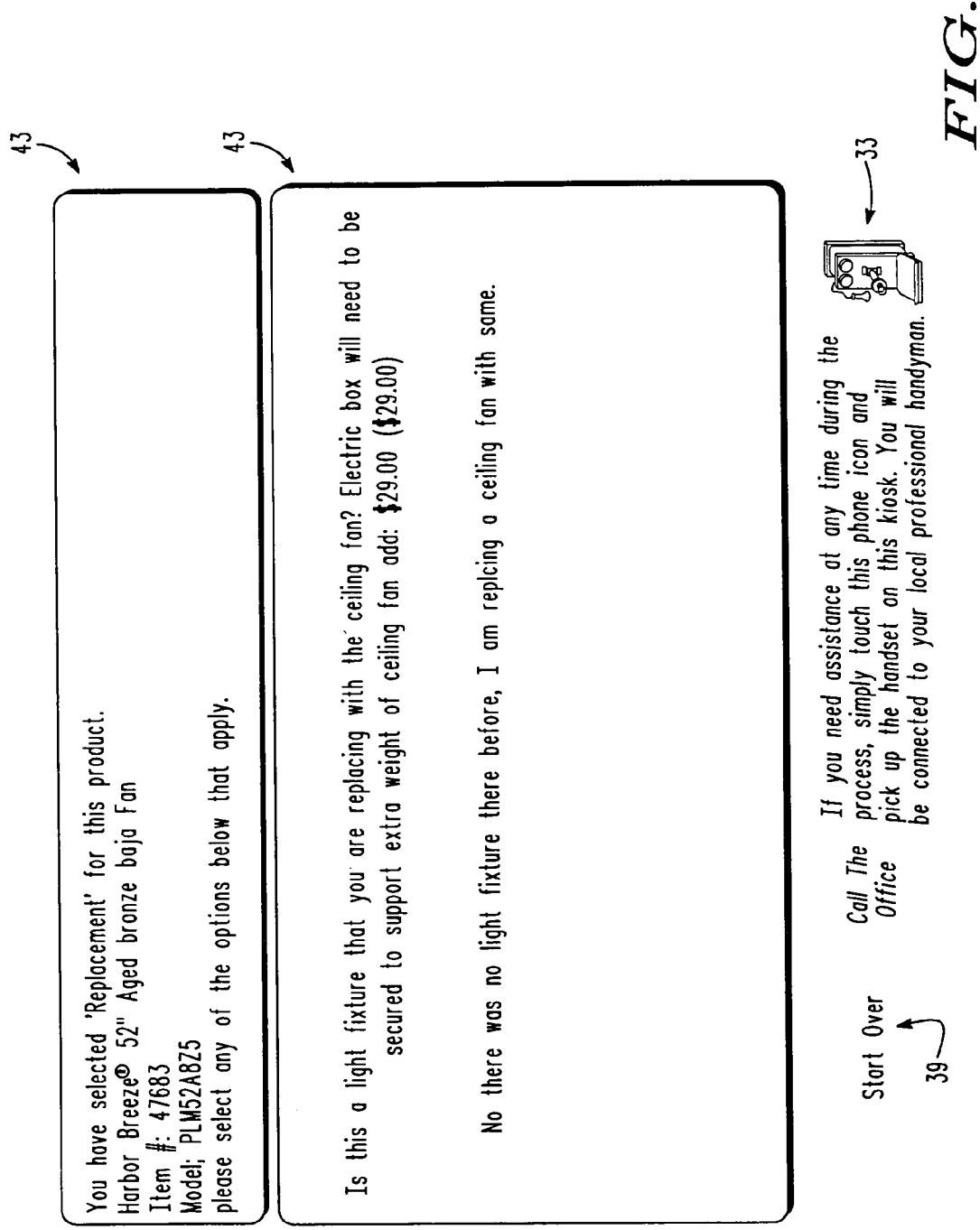
Figure 22:
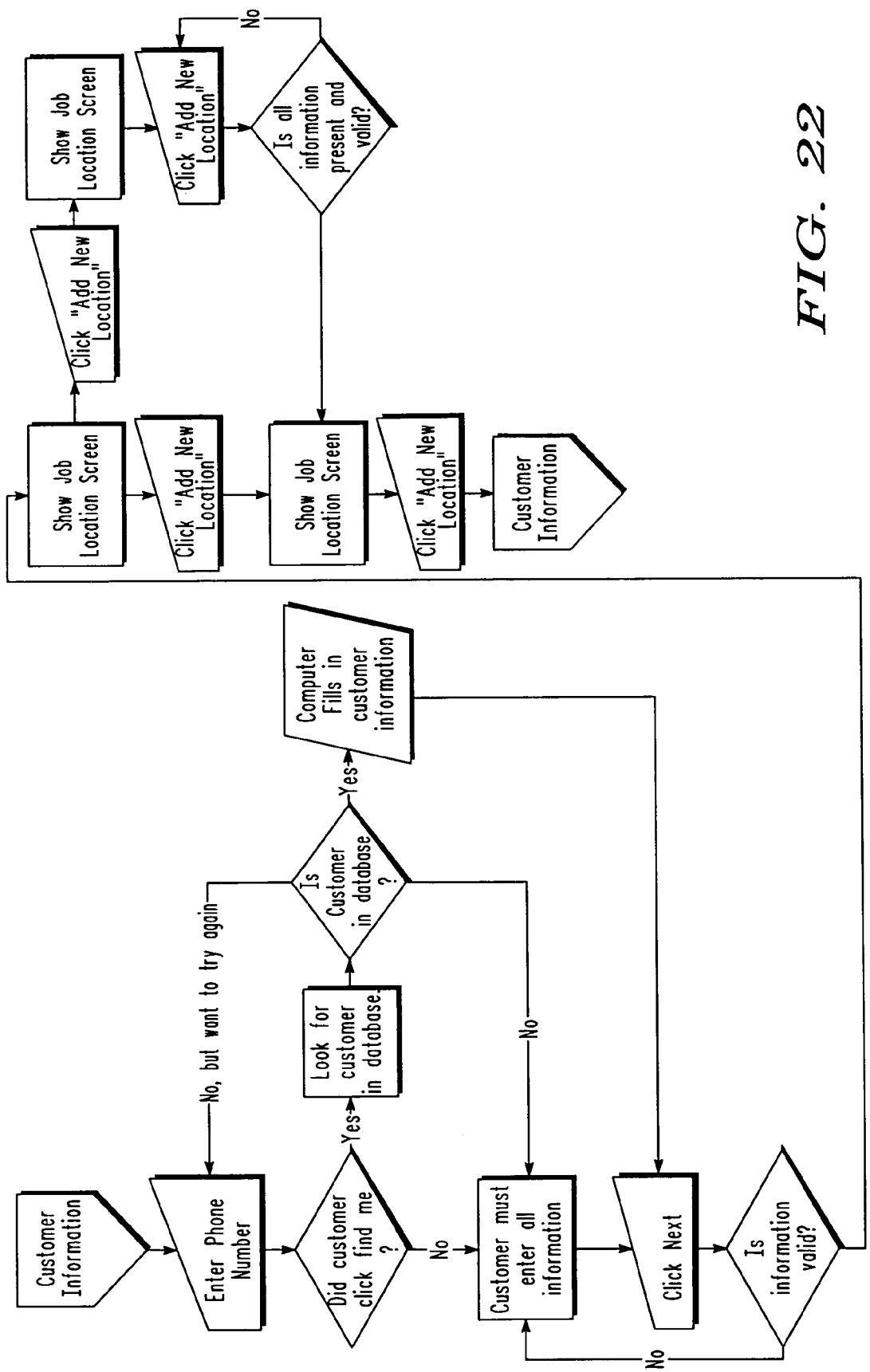
Figure 24:
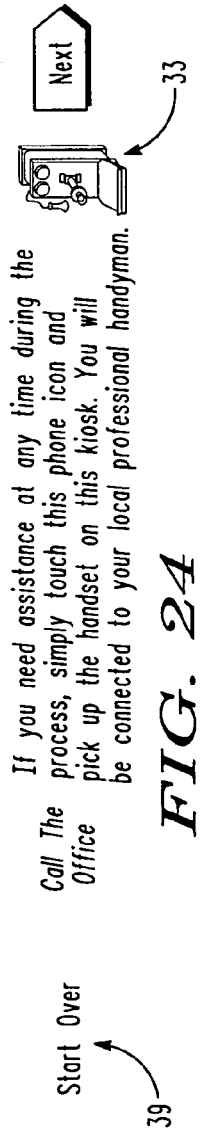
Figure 25:
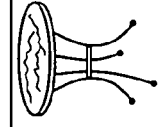
Figure 26:
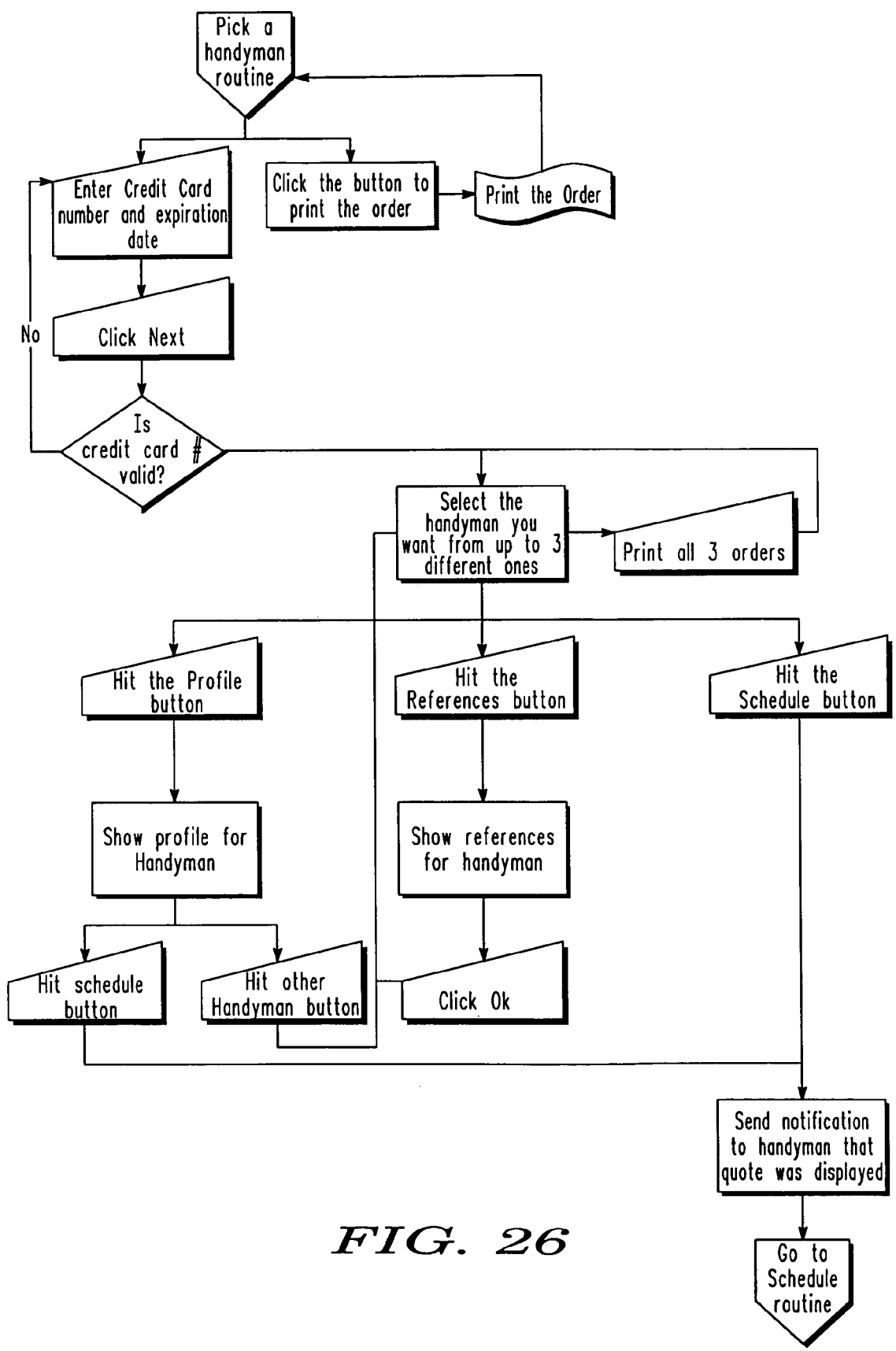
Figure 27:
Figure 28B:
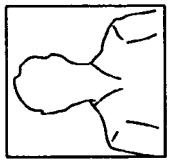
Figure 31:
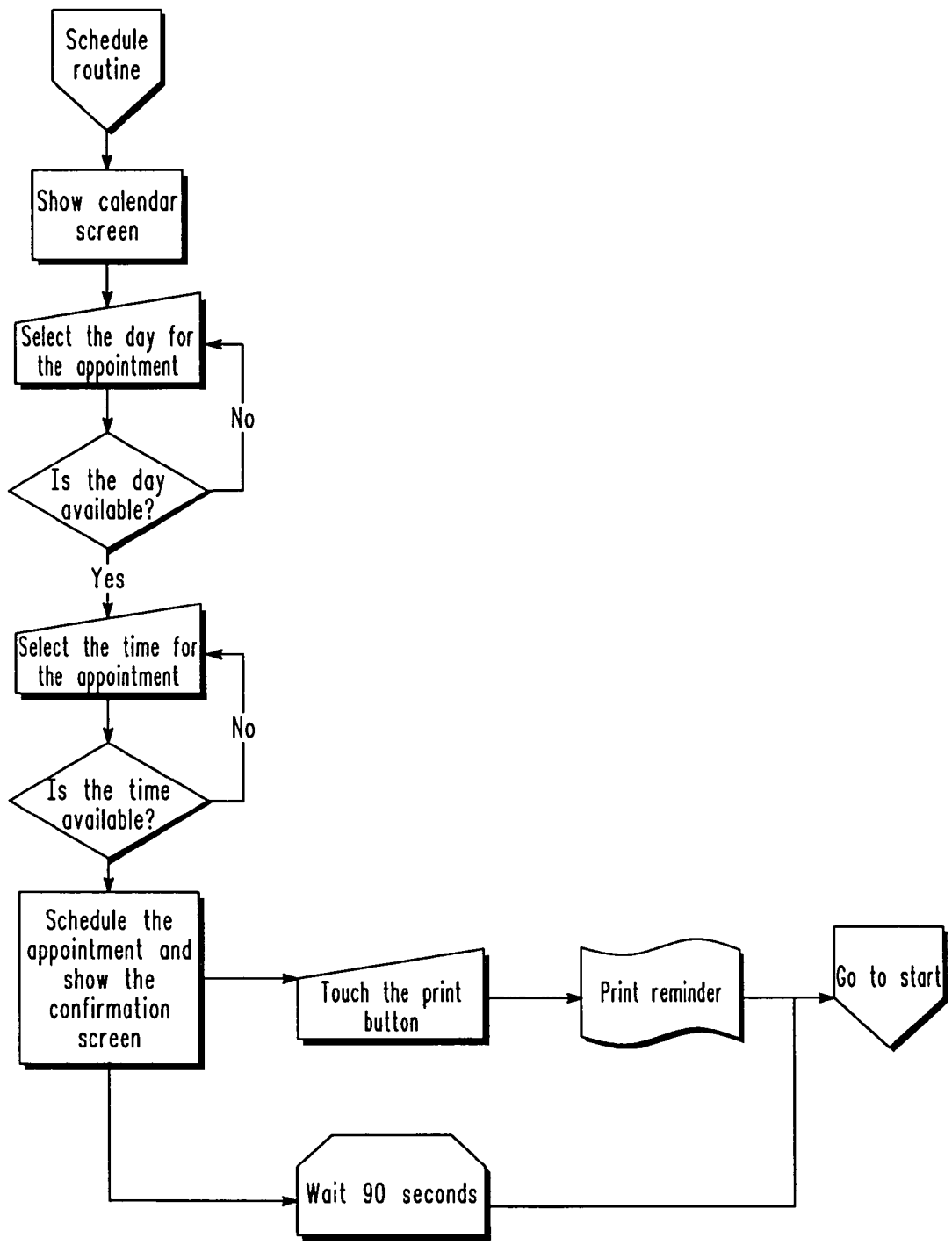
Figure 32:
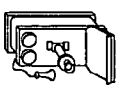

FIG. No. 2 is a flow chart diagram showing Call the Office routine methodology.

FIG. No. 3 is a generic screen shot showing a Zip Code Entry prompt and user-based data input means.

FIG. No. 4 is a generic screen shot showing a Call the Office prompt and a Zip Code Reentry prompt.

FIG. No. 5 is a generic screen shot showing Dialing Phone information.

FIG. No. 6 is a flow chart diagram showing Service Type routine methodology.

FIG. No. 7 is a generic screen shot showing a plurality of primary service category prompts.

FIG. No. 8 is a flow chart diagram showing New Installation/Replacement routine methodology.

FIG. No. 9 is a generic screen shot showing HAVE SKU and DO NOT HAVE SKU prompts.

FIG. No. 10 is a flow chart diagram showing HAVE SKU routine methodology.

FIG. No. 11 is a generic screen shot showing a SKU item number prompt and user-based data input means.

FIG. No. 12 is a generic screen shot showing Installation Type prompts.

FIG. No. 13 is flow chart diagram showing DO NOT HAVE SKU routine methodology.

FIG. No. 14 is a generic screen shot showing primary service categories, namely, New Installations/Replacements; Repairs/Assembly/Build; Maintenance; Hire Me by the Hour; Landscaping; Special Services; Cleaning; and Heating & Air Conditioning, the New Installations/Replacements category being highlighted, and a secondary service category listing corresponding to the highlighted category.

FIG. No. 15 is a generic screen shot showing primary service category prompts as depicted in FIG. No. 14, the New Installations/Replacements category being highlighted, and a secondary service category listing corresponding to the highlighted New Installation/Replacements category.

FIG. No. 16 is a generic screen shot showing primary service category prompts as depicted in FIG. No. 14, the New Installations/Replacements prompt being highlighted, and a tertiary service category listing corresponding to the highlighted Lighting prompt.

FIG. No. 17 is a flow chart diagram showing Select Category routine methodology.

FIG. No. 18 is a flow chart diagram showing Hourly routine methodology.

FIG. No. 19 is a flow chart diagram showing Install Type and Options routine methodology.

FIG. No. 20 is a generic screen shot showing an Enter Room for Installation prompt and user-based data input means.

FIG. No. 21 is a generic screen shot showing option selection prompts.

FIG. No. 22 is a flow chart diagram showing Customer Information routine methodology.

FIG. No. 23 is a generic screen shot showing a Customer Information prompt and user-based data input means.

FIG. No. 24 is a generic screen shot showing Job Locations information.

FIG. No. 25 is a generic screen shot showing Order Summary information, including labor costs.

FIG. No. 26 is a flow chart diagram showing Pick a Handyman routine methodology.

FIG. No. 27 is a generic screen shot showing a Credit Card Information prompt and user-based data input means.

FIG. No. 28 is a generic screen shot showing a select Handyman Grouping.

FIG. No. 29 is a generic screen shot showing a select Handyman Profile, including an exhaustive attribute listing.

FIG. No. 30 is a generic screen shot showing select Handyman References.

FIG. No. 31 is a flow chart diagram showing Schedule routine methodology.

FIG. No. 32 is a generic screen shot showing an Availability Calendar comprising a plurality of calendar days and an appointment time listing for one highlighted calendar day.

FIG. No. 33 is a generic screen shot showing service appointment confirmation information and a Print Confirmation prompt.

DETAILED DESCRIPTION OF THE PREFERRED METHODOLOGY

Referring now to the drawings, the present invention generally concerns a system or method for electronically scheduling service appointments based on location-specific information, service-specific information, or other select service provider attributes. More particularly, the preferred methodology of the present invention concerns a method for enabling a user to electronically schedule a location-specific and service-specific handyman service appointment. A handyman is commonly understood to be one who performs odd jobs and other small tasks. In the present sense, it is contemplated that a handyman is a service provider who performs any of a number of services, including, but not limited to new product installation services; product replacement services; product repair services; product assembly services; product construction services; maintenance services; landscaping services; cleaning services; and heating and/or air conditioning services. Other services may be broadly categorized as special services or a combination of the foregoing services. The so-called special services, as designated by a special services category 10, is referenced in FIG. Nos. 6, 7, and 14-16 and may be thought to encompass any number of services not otherwise specifically listed in the present descriptions.

It will be further noted that oftentimes service providers or handymen may be hired by the hour to perform various tasks or special services as required by the consumer or customer. Thus, an hourly service category or a so-called "Hire Me by the Hour" service category 11 is further referenced in FIG. Nos. 6, 7, and 14-16. From an inspection of the noted figures, it will be seen that a New Installations/Replacements service category 12 is referenced. It will be seen from a particular inspection of FIG. Nos. 14-16 that New Installations/Replacements service category 12 is depicted as having been highlighted or selected. It will thus be understood that when a primary (broad-based) service category is selected, such as New Installations/Replacements service category 12, a number of sub-service categories (secondary service categories, tertiary service categories, quaternary service categories, etc.) may depend from the primary service category. For purposes of ease and brevity of description, only various sub-service categories for New Installations/Replacements service category 12 are depicted in the figures (See FIG. Nos. 14-16) which form a portion of this specification.

A secondary service category listing corresponding to the highlighted New Installations/Replacements service category 12 is generally depicted in FIG. No. 14. From an inspection of FIG. No. 14, it will be seen that the New Installations/Replacements service category 12 is highlighted or selected. Further presented are a number of sub-service categories or secondary service categories corresponding to the highlighted or selected primary service category. Thus, it will be seen that the first sub-service category or the secondary service category for New Installations/Replacements service category 12 comprise Appliances 13; Cabinets and Hardware 14; Doors and Windows 15; Electrical 16; Flooring 17; Home Décor—Interior Exterior 18; Lighting 19, etc. FIG. No. 15 depicts a highlighted or selected first sub-service category or secondary service category Lighting 19. FIG. Nos. 15 and 16 depict the sub-service category or secondary service category Lighting 19 with second sub-service categories or tertiary service categories, namely, Ceiling Fans (not specifically referenced); Interior Decorative Lighting 20 and Landscape Lighting 21. It will be seen from an inspection of FIG. No. 20 that sub-service category Interior Decorative Lighting 20 is highlighted or selected and thus a number of third sub-service categories or quaternary service categories have been depicted, namely, Ceiling Fan Light Kits 22; Chandeliers 23, Interior Flush/Semi Flush Lights 24; Interior Vanity/Bar/Strip Lights 25; Interior Wall Lights/Sconces 26 and Pendants 27. It will thus be understood that users of the present methodology may utilize a similar type of organization scheme for other primary service categories such as Repairs/Assembly/Build 28; Maintenance 29; Landscaping 30; Cleaning 31; and Heating and/or Air Conditioning 32, which primary service categories are referenced in FIG. Nos. 6, 7. Each primary service category may thus comprise various sub-service categories as required or needed by the primary service category.

Notably, if a user selects a sub-service category (for example, dishwasher repair) and the system does not offer the sub-service category at the point in time of use, the user will be advised that the sub-service category is not available at that time and redirected to select an alternative (sub-) service category or redirected to start the process over. Further, if the user selects multiple service categories, which service categories require varying skill levels (for example, a licensed plumber's skill level for installing a faucet or a licensed electrician's skill level for installing an chandelier), it is contemplated that the system will prompt the user with several options, as follows. It is contemplated that a given service provider or handyman may have both electric and plumbing skill levels appropriate for a service category. In this regard, the system will prompt the user to make a selection between (1) scheduling a single service provider who can perform both the electrical and plumbing services or (2) scheduling several service providers, each being selected for a single service category.

The preferred methodology inherently involves various steps and in this regard, the method comprises an initial step of providing electronic means for scheduling a service (in particular or preferably a handyman service according to the foregoing descriptions). It is thus contemplated that the electronic means for scheduling a service preferably comprise data input means (user-based data input means and provider-based data input means), data output means (user-based data output means and provider-based data output means), central processing means (including memory), and a communication network. The data input means may be defined by any number of data input devices, including, but not limited to a keyboard, a mouse, a microphone, a scanner, a digital camera, and a PC camera. The data output means may be defined by any number of data output devices, including, but not limited to a printer, a monitor, and speakers. The communication network electronically interconnects the data input means, the data output means, and the central processing means. The central processing means preferably comprises or stores a precompiled handyman or service provider database. In this last regard, it is contemplated that the electronic means for scheduling a handyman service or other service may thus be defined by a computer network comprising cooperatively associated computer hardware, and proprietary computer software to enable functionality of the present system or methodology. A host computer, perhaps located at a handyman headquarter, central management office, or other service provider headquarters stores a service provider database or handyman database, which database may be accessed from remote locations (either from remote kiosk type locations or other remote computer locations) in network communication with the host computer or central processing means. The database, once accessed, may then be searched for certain types of information. When certain types of information are found or matched, the same may be retrieved from the database, compiled, and sent to the remote users for further study, inspection, or action. Additionally, the electronic means for scheduling a service may comprise user-based telephone hardware, provider-based telephone hardware, and a telephone network interconnecting the user-based telephone hardware, provider-based telephone hardware for enabling telephonic communication between users of the invention and service providers.

Key to the invention is the fact that consumers often desire to obtain location-specific services. In other words, those in need of certain services, such as product installation services, typically seek out handymen or other service providers in close geographic relation to the target service site. In other words, when a service is desired or otherwise required for a residence, a business, or the like, the service seeker typically seeks out service providers within a certain geographic radius from the target service site. Traditionally, location-specific service providers have been found in telephone listings or similar other means, which listings purposefully target certain geographic areas. The present methodology contemplates compiling an exhaustive listing of service providers spread out over a large geographic region, so that users of the method located within the large geographic region may find or otherwise select service providers who operate within smaller zones within the large geographic region. It is thus contemplated that the service provider database or handyman database is an all-encompassing database comprising service providers from any geographic region so that when users of the method tap into the database, they may be able to locate service providers in their target geographic location or region.

A widely used means for accurately locating or addressing certain geographic locations is the postal zip code. The zip code is a system used in the United States to primarily facilitate the delivery of mail, consisting of a five- or nine-digit code printed directly after a postal address (i.e. a specific geographic location), the first five digits (initial code) indicating the state and post office or postal zone, the last four (expanded code) the box section or number, portion of a rural route, building, or other specific delivery location. Thus, in order to start the process, a user may input into the communication network via the user-based data input means (i.e. a number pad and a GO prompt or button) a zip code of the target service location where he or she may want to direct the service provider. Thus, it is contemplated that the method comprises a preliminary step (i.e. a step before inputting the user's target service location into the central processing means), the preliminary step comprising prompting the user via the user-based data output means to input the user's target service location. For example, given a view screen or monitor as data output means, a first user prompt (or Zip Code Entry prompt 35) may be displayed upon the view screen. The first user prompt essentially prompts the user to input the user's target service location into the central processing means via the user-based data input means.

The described preliminary and/or initial methodology is generally referenced in FIG. No. 1 and supported by the generic screen shot as depicted in FIG. No. 3. Zip Code Entry prompt 35, as depicted in FIG. No. 3, prompts the user to input the desired zip code. After the data is input, the zip code is then processed by the central processing means. The central processing means decides whether the zip code represents a geographic location that is serviced by the system or methodology (as controlled by service location information provided by the service providers). In other words, the central processing means decides whether any of the service providers in the service provider database service locations defined by the zip code (or bordering zip codes) entered. If the input or entered zip code represents a geographic location that is serviced by the system or methodology, the methodology proceeds to a Service Type routine. If the input or entered zip code represents a geographic location that is not serviced by the system or methodology, the user is invited to (1) telephone the service provider headquarters or a telephone agent thereof so that the user may telephonically arrange for, or otherwise inquire about, the possibility of arranging for location-specific services or (2) enter an alternative zip code. The user is invited to telephone the service provider headquarters or a telephone agent thereof via a Call the Office prompt 33 as referenced in FIG. Nos. 3, 4, 7, 9, 11, 12, 14-16, 20, 21, 23-25, 27, 28, 32, and 33. Notably, the user may, at any time, opt to telephone the service provider headquarters by initializing the Call the Office routine, which Call the Office routine may be prompted by selecting Call the Office prompt 33. Further, the user may start the current system or method over at any time by selecting a Start Over prompt 39 as referenced in FIG. Nos. 3, 7, 9, 11, 12, 14-16, 20, 21, 23, 24, 27, 28, 32, and 33.

The user is invited to enter an alternative zip code via a Zip Code Reentry prompt 34 as further referenced in FIG. No. 4. If the user elects to telephone the service provider headquarters or a telephone agent thereof by inputting (e.g. by clicking on or touching) Call the Office prompt 33, the methodology proceeds to a Call the Office routine. If the user elects to enter an alternative number or does nothing, the methodology proceeds and returns to the Zip Code Entry prompt 35 as generally referenced in FIG. No. 3. After inputting the Call the Office prompt 33, the central processing means directs the operation of the telephone network (e.g. dials the provider-based telephone hardware) whereafter the user may be properly directed to pick up the user-based telephone hardware (a handset) as generally depicted in FIG. No. 5. Thus, the Start Process routine methodology may be readily understood from an inspection and analysis of FIG. Nos. 1-5 in conjunction with the foregoing descriptions. Thus, it will be seen that the method comprises the step of inputting a target service location into the central processing means via the user-based data input means and the communication network.

The methodology of the present invention further contemplates or comprises a step of inputting a desired handyman service or other desired service type into the central processing means via the user-based data input means and the communication network. The desired handyman service or other desired service type, it will be recalled, may be selected from select service category as previously specified. In this regard, the Service Type routine as generally depicted in FIG. No. 6 as viewed in conjunction with FIG. Nos. 7, and 14-16, demonstrates the general outline for selecting and inputting a desired handyman service or other desired service type into the central processing means via the user-based data input means and the communication network. It will be understood that the method comprises certain steps before actually inputting the user's desired handyman service into the central processing means and after inputting the user's target service location into the central processing means. The additional steps comprise prompting the user with a primary handyman service listing upon the user-based data output means and selecting a primary service category from the primary handyman service listing (the primary handyman service listing comprising a plurality of primary service categories as previously described). The primary service category enables the user to more accurately input the desired handyman service.

It will be recalled that the method comprises additional steps after selecting the primary service category from the primary handyman service listing, the additional steps comprising prompting the user with at least one secondary handyman service listing upon the user-based data output means and selecting at least one secondary service category from the secondary handyman service listing. As previously described, the secondary handyman service listing may comprise a plurality of sub-service or secondary service categories. Notably, the selected secondary service category also enables the user to more accurately input the desired handyman service.

From an inspection of FIG. No. 8, it will be seen that when a primary service category is selected/input, such as New Installation/Replacement primary service category 12, the methodology may optionally proceed to certain product-identifying or Stock Keeping Unit (SKU) routines. In this regard, it is contemplated that users of the current system may elect to instruct the service provider to purchase parts or products in order to more properly complete the task at hand or may elect to advise the service provider which part or product (requiring service) the user has already purchased or otherwise obtained.

The SKU routines are preliminarily referenced in FIG. Nos. 8, 10, and 13, which flow chart diagrams are supported by generic screen shots as depicted in FIG. Nos. 9, 11, and 12. Thus, it will be understood that after a primary service category is selected, as generally depicted by the New Installation/Replacement routine in FIG. No. 8, the user is simultaneously presented with a HAVE SKU prompt 36 and a DO NOT HAVE SKU prompt 37 as generally depicted in FIG. No. 9. After the user inputs data regarding whether the user has product identifying information, such as an SKU number, the methodology proceeds to either a HAVE SKU routine (or have product in hand routine) as generally depicted in FIG. No. 10 or a DO NOT HAVE SKU routine (or a do not have product in hand routine) as generally depicted in FIG. No. 13. Thus, the user may effectively decide whether to obtain product securement services through the service provider.

If the user elects to obtain product securement services by inputting (e.g. by clicking on or touching) HAVE SKU prompt 36, the methodology proceeds to a HAVE SKU routine (See FIG. No. 10). If the user elects not to obtain product securement services by inputting DO NOT HAVE SKU prompt 37, the methodology proceeds to a DO NOT HAVE SKU routine (See FIG. No. 13). After inputting the HAVE SKU prompt 36, the central processing means directs the user to input product-identifying means (e.g. a Stock Keeping Unit (SKU) number or similar other identifier). From an inspection of FIG. No. 11, it will be seen that the user may input product-identifying means via user-based data input means. The central processing means then searches for the product (as identified by the product-identifying means) in a product database, which product database may also be stored or otherwise accessed by the central processing means. If the product cannot be found in the product database, the user is prompted to enter alternative product-identifying means. If the product is found in the product database, the methodology then proceeds to a selection of sub-service categories as previously described. In the case of New Installation/Replacements primary service category 12, the user may then proceed to an Installation Type prompt 38 as generally depicted in FIG. No. 12.

From an inspection of FIG. No. 12, it will be seen that either a New Installation prompt 40 may be selected or a Replacement prompt 41 may be selected. It will be further seen that Installation Type prompt 38 provides the user with information about each selection such as cost and the type of service included for each installation type. It will be further seen that a product confirmation 42 may also be presented to the user during this step. After data regarding the product-identifying means and installation type are entered, the user may then proceed to a Room and Options routine (depending on the selected primary service category) as may be seen from a general inspection of FIG. No. 10.

After inputting DO NOT HAVE SKU prompt 37, the central processing means directs the user to select a service category via the Select Service Type routine and depending sub-service routines (i.e. both primary service categories and sub-service categories) as earlier described. Examples of this type of methodology may be seen from an inspection of FIG. Nos. 13 and 17. It will be noted that it is contemplated that Installation Type prompt 38 (as it enables an installation type) may itself function as a sub-service type category as further generally depicted in FIG. No. 13. After data regarding the selected service type is finally input, the user may then proceed to the Room and Options routine as may be further seen from a general inspection of FIG. No. 13.

Thus, it will be seen that the present inventive methodology comprises additional steps after selecting the primary service category from the handyman service listing or desired service listing, the additional steps comprising displaying a SKU number prompt upon the user-based data output means and inputting a select SKU response (or a select product-identifying response). The SKU number prompt effectively prompts the user to input at least one SKU number. The SKU number, it will be readily understood, corresponds to a primary service product and the desired or otherwise selected handyman service or desired service enables functionality of the primary service product. In other words, a handyman may be hired to install a lighting fixture. The lighting fixture installation services (the desired handyman service) thus enables functionality of the lighting fixture (the primary service product).

The select SKU response may be selected from the group consisting a HAVE SKU number response and a DO NOT HAVE SKU number response, the HAVE SKU number response being confirmed during later occurring methodology, such as during a step of providing a service appointment confirmation to a select service provider. The HAVE SKU number response thus prompts the select service provider to obtain the primary service product before the handyman service appointment.

Thus, it will be seen that the system comprises a product identifying prompt and a select product-identifying response, the product identifying prompt being provided the user via the data output means. The product-identifying prompt prompts the user to input product-identifying means, the product-identifying means corresponding to a primary service product, the desired service type for enabling functionality of the primary service product. The select product-identifying response is input into the central processing means via the data input means and is selected from the group consisting of an identifying means response and a NO PRODUCT response, the identifying means response being confirmed to the select service provider. The identifying means response thus functions to prompt the select service provider to obtain the primary service product before the service appointment.

FIG. No. 18 depicts certain methodology if Hire me by the Hour prompt 11 is selected. It will be noted from an inspection of FIG. No. 18 that the hourly routine comprises service type methodology similar to those routines as described by the foregoing select service type specifications as well as the routines depicted in FIG. Nos. 13 and 17. It will be further seen, however, that the hourly routine further comprises a step whereby the user enters the number of hours that the user desires to hire the service provider. After data regarding the selected service type and number of desired hours is finally input, the user may then proceed to the Room and Options routine as may be further seen from a general inspection of FIG. No. 18.

FIG. No. 19 is a flow chart diagram showing Install Type and Options routine methodology. FIG. Nos. 20 and 21 are generic screen shots to be viewed in conjunction with FIG. No. 19 and thus are supportive of the methodology depicted in FIG. No. 19. In the case of new installations and/or replacement services, it is often helpful to provide the service provider with information as to which room of a dwelling or other building structure will receive the benefit of the desired service. It will thus be seen from an inspection of FIG. No. 20 that an Enter Room for Installation prompt 42 prompts the user to input room information via the user-based data input means. The user may then be presented with further prompts (not specifically depicted) regarding quantity of product if the product requires the same. After inputting various data regarding the room and/or product quantity, the user then proceeds to input options information via options selections prompt(s) 44 as is generally depicted in FIG. No. 21. Part of the options selection information or options selection data may comprise installation type data (as previously described). Further, an installation type and/or product confirmation 43 may further be provided the user as a means to provide the user with additional options selection information.

After inputting the target service location and the desired handyman service, the method involves searching the handyman database, which handyman database comprises a plurality of handyman resumes as generally referenced in FIG. No. 28. It will be understood that traditional resumes provide readers with summary descriptions of the qualifications, experience and other useful information that may be said to describe the individual identified in the resume. In this case, each handyman resume comprises a plurality of primary handyman attributes, which primary attributes are broad-based attributes that may or may not appear in brief descriptions of the identified service provider. In this regard, it is contemplated that the primary handyman attributes inherently comprise service location information (i.e. those geographic locations serviced by any given service provider or handyman) and service expertise information (those service offered by any given service provider or handyman). From an inspection of FIG. No. 28, it will be seen that the primary handyman attributes actually displayed upon the user-based data output means comprise the name of the service provider, an address from which the service provider operates (not specifically shown), a cost estimate for the desired handyman service, a discount offer, certain calendar information, and a photograph of the service provider as generally referenced at 60 in FIG. Nos. 28 and 29. Notably, the service location information and service expertise information are necessarily included in the handyman resume but are otherwise hidden from view. Rather, the service location information and service expertise information are utilized to provide the service provider grouping and the user can then make an informed selection from the service provider grouping based on the presented or displayed information.

It will be seen from an inspection of FIG. No. 28 that a Profile prompt 54 and a References prompt 55 are further displayed upon handyman resume(s) 49. It is contemplated that after presenting or displaying the select handyman grouping upon the user-based data output means and before finally selecting at least one handyman resume from the select handyman grouping, the user may wish to peruse or otherwise review at least one select handyman profile 56 as generally depicted in FIG. No. 29. It will be seen from an inspection of FIG. No. 29 that the select handyman profile essentially comprises an exhaustive attribute listing, which exhaustive attribute listing functions to provide the user with further handyman or service provider selection information. In other words, the select handyman profile includes information useful to the user in terms of making a more informed decision as to which handyman or service provider may best meet the needs of the user. Further, it is contemplated that users may wish to inspect certain references for any given service provider. The user may thus inspect references 57 (as generally depicted in FIG. No. 30) by inputting References prompt 55. The exhaustive attribute listing may thus be said to comprise reference information and in this regard, it is contemplated that the exhaustive attribute listing may be defined by comprising certain reference information as reference information may prove useful to the user in terms of making a more informed decision as to which handyman or service provider may best meet the needs of the user.

During the searching step, certain information or data found and noted or is matched with certain other information or data in much the same manner as traditional structured form search (Boolean-type) engines function. Thus the method includes matching the target service location with the service location information and matching the desired handyman service with the service expertise information. The matching sequence thus enables the system to compile a select handyman (or service provider) grouping 45, which select handyman grouping 45 is generally referenced in FIG. No. 28. From an inspection of FIG. No. 28, it will be seen that select handyman grouping 45 comprises at least two handyman resumes 49 (three handyman resumes 49 being referenced in FIG. No. 28). Select handyman grouping 48 is thus compiled based on the matched service location information (the service location information being matched against the target service location information) and the matched service expertise information (the service expertise information being matched against the desired handyman service).

It should be noted that the service expertise information comprises certain information regarding qualifications and licensing attributes. In this regard, it will be appreciated that certain services require certain service provider qualifications. For example, electrical services require that the service provider be properly licensed. Only those service providers having the necessary service expertise or service qualifications will thus be included in the handyman grouping or service provider grouping for various desired services. The service expertise information may thus be said to encompass or incorporate the noted service qualifications for any given type of service. In other words, the handymen or service providers that are displayed to the customer are selected based on skills required for the product purchased or the desired service and the skills that the handyman possesses. Only handymen or service providers with the appropriate skills will be shown to the user for any given service.

It will thus be understood that once select handyman grouping 48 is compiled, select handyman grouping 48 is displayed upon the user-based data output means (or otherwise provided to the user) so that the user may select a handyman or other service provider from the grouping. It is contemplated that at least two handyman resumes 49 are preferably displayed so that the service providers may provide the users with a more competitive selection process.

It will be recalled that FIG. No. 26 generally depicts a Pick a Handyman routine and that FIG. No. 31 generally depicts a Schedule routine. FIG. No. 26 is supported by FIG. Nos. 27-30 and FIG. No. 31 is supported by FIG. Nos. 32 and 33. In order to choose a service provider and finally schedule the service provider, the user of the method selects at least one handyman (or service provider) resume 49 from select handyman (or service provider) grouping 48, whereafter an availability calendar 50 is displayed or provided upon the user-based data output means (or otherwise provided to the user), which availability calendar 50 is generally depicted in FIG. No. 32. It will be understood that availability calendar 50 essentially corresponds to the selected handyman resume, and comprises a plurality of calendar days, each calendar day comprising an available appointment time listing. From an inspection of FIG. No. 32, it will be seen that a single calendar day has been highlighted as referenced at 51 and an available appointment time listing 52 appears for the highlighted calendar day. The user may then select at least one calendar day and at least one appointment time from availability calendar 50. It should be noted that the available dates for a handyman take into account if the user is in a bordering zip code of an existing appointment for any given handyman or service provider.

Thus, the selected handyman resume, the selected calendar day, and the selected appointment time effectively operate to electronically schedule a location-specific and service-specific handyman service appointment. The final scheduling may be input into the central processing means via a schedule prompt (not specifically depicted). The handyman service appointment is location-specific as the appointment is based on the matched service location information and the handyman service appointment is service-specific as the appointment is based on the matched service expertise information.

The method may comprise an additional step after selecting at least one calendar day and at least one appointment time from the availability calendar, the additional step comprising providing service appointment confirmation (as generally depicted in FIG. No. 33) to a select network member via the communication network, the user-based data output means, and the provider-based data output means. In this regard, it is contemplated that the select network member may be selected from the group consisting of a select service provider and a user of the method. The select service provider may be selected from the group consisting of a select handyman (or select service provider) and a handyman headquarters or central management office, the select handyman (or select service provider) being the individual identified in the selected handyman (or service provider) resume. In other words, once the service appointment is made by selecting a handyman or service provider from the service provider grouping, choosing a calendar day and an appointment time, the information may be confirmed back the user upon the user-based data output means (e.g. a view screen adjacent the site of user-based data input means). This type of confirmation has been depicted in FIG. No. 33. Further confirmations, however, may also be sent to the individual service provider upon the provider-based data output means (e.g. a view screen adjacent the site of provider-based data input means) or similarly, to the handyman headquarters or home office from which the individual service provider operates.

As may be further seen from an inspection of FIG. No. 33, the method may comprise an additional step after displaying confirmation of the handyman service appointment to a select network member. The additional step being providing the select network member with a hard copy of the displayed confirmation as, for example, by printing a copy of the displayed confirmation. It will be recalled that FIG. No. 33 is a generic screen shot showing confirmation of a handyman service appointment and a Print Confirmation prompt 53. By inputting Print Confirmation prompt 53, the user may thus obtain a hard copy of the confirmation according to traditional print function methodology.

The system or method further contemplates a customer information routine as generally depicted in FIG. No. 22, which routine is supported by FIG. Nos. 23-25. Customer information routines such as the one depicted in FIG. No. 22 and supported by FIG. Nos. 23-25, are commonly practiced. The same have been included as an aid to the reader to help the reader understand the present system or method in its entirety. It is believed that the depictions as appear in FIG. Nos. 22-25 will be readily understood by those in the art and thus no further descriptions thereof are necessary to practice the current methodology or system.

It will thus be understood that the present invention provides a system for enabling a user to electronically schedule a location-specific service appointment, the system comprising electronic means for scheduling, a target service location, a desired service type, a select service provider grouping, and an availability calendar. The electronic means for scheduling comprises data input means, data output means, central processing means, and a communication network. The communication network electronically interconnects the data input means, the data output means and the central processing means. The central processing means comprises a precompiled service provider database. The target service location and the desired service type are input into the central processing means via the data input means and the communication network. The service provider database, comprising a plurality of service provider resumes, is searched. Each service provider resume comprises a plurality of service provider attributes, which service provider attributes comprise service location information and service expertise information.

The target service location is matched with the service location information and the desired service type is matched with the service expertise information. The select service provider grouping is compiled based on the matched service location information and the matched service expertise information. The select service provider grouping is then displayed upon the data output means, and comprises at least one service provider resume. At least one service provider resume is selected from the select service provider grouping and the availability calendar is then displayed upon the data output means. The availability calendar corresponds to the selected service provider resume and comprises a plurality of calendar days, each calendar day comprising an available appointment time listing. At least one calendar day and at least one appointment time are selected from the availability calendar. The selected service provider resume, the selected calendar day, and the selected appointment time thus operate to electronically schedule a location-specific service provider appointment.

Further, the system comprises a service provider appointment confirmation, the service provider appointment confirmation being provided to a select network member via the communication network and the data output means. The select network member is selected from the group consisting of the select service provider and a user of the method, the select service provider being identified in the selected service provider resume. The service provider appointment confirmation may preferably be provided in hard copy.

The system further comprises a primary service listing, the primary service listing being displayed or otherwise provided to the user via the data output means. The primary service listing comprises a plurality of primary service categories and at least one primary service category is selected from the primary service listing, the selected primary service category enables the user to more accurately input the desired service type. The system further comprises at least one secondary service listing, the secondary service listing being displayed upon the data output means. The secondary service listing comprises a plurality of secondary service categories, at least one secondary service category being selected from the secondary service listing. The selected secondary service category enables the user to more accurately input the desired service type.

As earlier indicated, the system comprises a product identifying prompt and a select product-identifying response. The product identifying prompt is displayed upon the data output means and prompts the user to input product-identifying means. The product-identifying means correspond to a primary service product. The desired service type enables functionality of the primary service product as previously described. The select product-identifying response is input into the central processing means via the data input means and is selected from the group consisting of an identifying means response and a NO PRODUCT response. The identifying means response is confirmed to the select service provider and thus prompts the select service provider to obtain the primary service product before the service appointment.

Further, the system comprises at least one select service provider profile, each select service provider profile comprising an exhaustive provider attribute listing. The exhaustive provider attribute listing provides the user with exhaustive service provider selection information. In this last regard, it is contemplated, for example, that the system may enable the user to find service providers based on best discount offers, soonest available appointment dates, and/or previously utilized service providers. Any number of other criteria as found in the exhaustive service provider selection information may be utilized to select a service provider. Other features may be included in the design of the system. For example, should a user be prompted to input address information, such as during the credit card information routine (See generally FIG. Nos. 22 and 23), the system may check the information against previously compiled customer information to make sure that the user is not inputting misusing the system (e.g. by inputting information known to be incorrect). Oftentimes competitors are desirous of improperly obtaining price information as a means to stifle competition. In this regard, the system contemplates that if faulty information is input into the system (as compared to precompiled information), the system will redirect the user to either call the central management office or start over, as previously described. Thus, while the above description contains much specificity, this specificity should not be construed as limitations on the scope of the invention, but rather as an exemplification of the invention.

For example, the present invention provides a method or system for enabling a user to schedule a location-specific service appointment, the method comprising an initial step of determining first and second select service identifiers (the target service location and the desired service type). The first and second select service identifiers are selected from the group consisting of the target service location and the desired service type. The system or method then contemplates searching a service provider database. The service provider database comprises a plurality of service provider resumes, each resume comprising a plurality of service provider attributes, the service provider attributes comprising service location information and service expertise information. The target service location is matched with the service location information and the desired service type is matched with the service expertise information. A select service provider grouping is then compiled, the select service provider grouping being compiled based on the matched service location information and the matched service expertise information. The select service provider grouping comprises at least one service provider resume.

The user then selects at least one service provider resume from the select service provider grouping, which service provider resume comprises an availability calendar. The availability calendar comprises a plurality of calendar days, each calendar day comprising an available appointment time listing. The user then selects at least one calendar day and at least one appointment time from the availability calendar. The selected service provider resume, the selected calendar day, and the selected appointment time thus operate to schedule a location-specific service provider appointment. The method further contemplates an additional step after determining at least one select service identifier, the additional step comprising ordering a service-related product. The select service provider may then obtain the primary service product before the service appointment.

The present invention thus provides a method for enabling a user to schedule an attribute-specific service appointment, the method comprising the steps of determining at least one select service identifier; searching a service provider database; compiling a select service provider grouping; selecting at least one service provider resume from the select service provider grouping; and selecting at least one calendar day and at least one appointment time from the availability calendar. The select service identifier is selected from an identifier group comprising a target service location, a desired service type, and a select profile attribute. The service provider database comprises a plurality of service provider resumes, each service provider resume comprising a plurality of service provider attributes. The service provider attributes comprise service location information, service expertise information, and profile attribute information. In this last regard, it is contemplated that the attribute-specific service appointment may be based upon any attribute of the service provider as may be found in the exhaustive attribute listing. In other words, it is contemplated that in addition to location-specific information and service-expertise information, the service appointment may be based upon any of the attributes of the service provider. The select service identifier is matched with at least one select provider attribute, the select provider attribute being selected from an attribute group comprising the service location information, the service expertise information, and the profile attribute information. The select service identifier is thus matched with the select provider attribute. The select service provider grouping is compiled based on the matched select service identifier and the select provider attribute. The select service provider grouping comprises at least one service provider resume. The service provider resume comprises an availability calendar, the availability calendar comprising a plurality of calendar days, each calendar day comprising an available appointment time listing. The selected service provider resume, the selected calendar day, and the selected appointment time thus operate to schedule an attribute-specific service provider appointment.

Accordingly, although the invention has been described by reference to a preferred methodology and/or system, it is not intended that the novel processes or system(s) be limited thereby, but that modifications thereof are intended to be included as falling within the broad scope and spirit of the foregoing disclosure, the following claims and the appended drawings.

I claim:

1. A method for enabling a user to electronically schedule a location-specific and service-specific handyman service appointment, the method comprising the steps of:

inputting a target service location and at least one desired handyman service into central processing means via a communication network, each desired handyman service being associated with a service time length;

continually tracking and summing service time length based on the selection of desired one or more handyman services;

continually providing an estimated total service time length to the user based on the selection of desired one or more handyman services;

searching a database stored within the central processing means, the database comprising handyman service location information and handyman service expertise information;

matching the target service location with the handyman service location information and the desired handyman service with the handyman service expertise information;

compiling a select handyman grouping, the select handyman grouping being compiled based on the matched handyman service location information and the matched handyman service expertise information;

presenting the select handyman grouping to a user, the select handyman grouping comprising at least two handyman resumes;

selecting at least one handyman resume from the select handyman grouping;

ordering a service-related product related to the desired handyman service; the desired handyman service for enabling functionality of the primary service product;

inviting the user to submit personalized service requests, each personalized service request being linked to and included within the total service time length;

providing an availability calendar, the availability calendar corresponding to the selected handyman resume and the service time length, the availability calendar comprising a plurality of calendar days, each calendar day comprising an available appointment time listing cooperative with the total service time length; and selecting at least one calendar day and at least one appointment time from the availability calendar, the selected handyman resume, the selected calendar day, and the selected appointment time thus operating to electronically schedule a location-specific and service-specific handyman service appointment.

2. The method of claim 1 wherein the method comprises an additional step after selecting at least one calendar day and at least one appointment time from the availability calendar, the additional step comprising providing a service provider appointment confirmation to a select network member, the select network member being selected from the group consisting of a select service provider and a user of the method, the select service provider being identified in the selected handyman resume.

3. The method of claim 2 wherein the selected handyman resume comprises a provider attribute listing, the provider attribute listing for providing the user with service provider selection information.

4. A method for enabling a user to electronically schedule a location-specific and service-specific handyman service appointment, the method comprising the steps of:

inputting a target service location and at least one desired handyman service into central processing means via a communication network, each desired handyman service being associated with a service time length;

continually tracking and summing service time length based on the selection of desired one or more handyman services;

continually providing an estimated total service time length to the user based on the selection of desired one or more handyman services;

searching a database stored within the central processing means, the database comprising handyman service location information and handyman service expertise information;

matching the target service location with the handyman service location information and the desired handyman service with the handyman service expertise information;

compiling a select handyman grouping, the select handyman grouping being compiled based on the matched handyman service location information and the matched handyman service expertise information;

presenting the select handyman grouping to a user, the select handyman grouping comprising at least two handyman resumes;

selecting at least one handyman resume from the select handyman grouping;

ordering a service-related product related to the desired handyman service; the desired handyman service for enabling functionality of the primary service product;

providing an availability calendar, the availability calendar corresponding to the selected handyman resume, the availability calendar comprising a plurality of calendar days, each calendar day comprising an available appointment time listing; and selecting at least one calendar day and at least one appointment time from the availability calendar, the selected handyman resume, the selected calendar day, and the selected appointment time thus operating to electronically schedule a location-specific and service-specific handyman service appointment.

5. The method of claim 4 wherein the desired handyman service is associated with a service time length, the availability calendar and appointment time listing cooperatively corresponding to the service time length.

6. The method of claim 5 wherein multiple desired handyman services are selected, each handyman service being associated with a select service time length, the selected service time lengths being summed prior to providing the availability calendar and service time listing.

7. The method of claim 6 wherein the method comprises an additional step after selecting at least one calendar day and at least one appointment time from the availability calendar, the additional step comprising providing a service provider appointment confirmation to a select network member, the select network member being selected from the group consisting of a select service provider and a user of the method, the select service provider being identified in the selected handyman resume.

8. The method of claim 7 wherein the selected handyman resume comprises a provider attribute listing, the provider attribute listing for providing the user with service provider selection information.

9. The method of claim 8 comprising the step of inviting the user to submit personalized service requests, each personalized service request being linked to and included within the total service time length before the step of providing an availability calendar.

* * * * *